United States Patent
Abraham et al.

(10) Patent No.: US 9,510,286 B2
(45) Date of Patent: Nov. 29, 2016

(54) SYSTEMS AND METHODS FOR SYNCHRONIZATION WITHIN A NEIGHBORHOOD AWARE NETWORK

(71) Applicant: QUALCOMM Incorporated, San Diego, CA (US)

(72) Inventors: Santosh Paul Abraham, San Diego, CA (US); George Cherian, San Diego, CA (US); Alireza Raissinia, Monte Sereno, CA (US); Guido Robert Frederiks, Aptos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 46 days.

(21) Appl. No.: 14/213,017

(22) Filed: Mar. 14, 2014

(65) Prior Publication Data

US 2014/0293851 A1    Oct. 2, 2014

Related U.S. Application Data

(60) Provisional application No. 61/888,396, filed on Oct. 8, 2013, provisional application No. 61/866,423, filed on Aug. 15, 2013, provisional application No. 61/859,668, filed on Jul. 29, 2013, provisional (Continued)

(51) Int. Cl.
*H04W 52/02* (2009.01)
*H04W 56/00* (2009.01)
*H04W 8/00* (2009.01)

(52) U.S. Cl.
CPC ......... *H04W 52/0225* (2013.01); *H04W 8/005* (2013.01); *H04W 52/0229* (2013.01); *H04W 56/002* (2013.01); *H04W 56/0015* (2013.01); *H04W 56/0035* (2013.01)

(58) Field of Classification Search
None
See application file for complete search history.

(56) References Cited

U.S. PATENT DOCUMENTS 6,665,316 B1    12/2003   Eidson
7,587,746 B1 *   9/2009   Schwartzman ........... H04L 5/14
                                                      370/230

(Continued)

FOREIGN PATENT DOCUMENTS

EP    2557867 A1    2/2013
EP    2560453 A2    2/2013

(Continued)

OTHER PUBLICATIONS

International Search. Report and Written Opinion—PCT/US2014/030438—ISA/EPO—Jun. 16, 2014.

(Continued)

*Primary Examiner* — Ayaz Sheikh
*Assistant Examiner* — Mariela Vidal Carpio
(74) *Attorney, Agent, or Firm* — Knobbe Martens Olson & Bear, LLP

(57) ABSTRACT

Methods, devices, and computer program products for synchronization of wireless devices in a peer-to-peer network are described herein. In one aspect, a method for determining at least one of a time for exiting and a time for entering a low power sleep mode to utilize a discovery window is provided. The method includes determining an earliest possible start time of a discovery window according to a clock at the first device. The method further includes transitioning from the low power sleep mode to a higher power active mode approximately at the determined earliest possible start time, wherein the determined earliest possible start time is based at least in part on a clock drift value associated with the first device and a clock drift value associated with a second device of the wireless network.

28 Claims, 14 Drawing Sheets

Related U.S. Application Data application No. 61/833,883, filed on Jun. 11, 2013, provisional application No. 61/832,706, filed on Jun. 7, 2013, provisional application No. 61/819,112, filed on May 3, 2013, provisional application No. 61/810,203, filed on Apr. 9, 2013, provisional application No. 61/805,858, filed on Mar. 27, 2013.

(56) References Cited

U.S. PATENT DOCUMENTS

| | | |
|---|---|---|
| 7,835,301 B1 | 11/2010 | Maufer |
| 2003/0103486 A1 | 6/2003 | Salt et al. |
| 2004/0008661 A1 | 1/2004 | Myles et al. |
| 2004/0013167 A1 | 1/2004 | Jones |
| 2004/0116110 A1 | 6/2004 | Amerga et al. |
| 2006/0133408 A1* | 6/2006 | Nogueira-Nine . H04W 52/0219 370/447 |
| 2007/0286136 A1* | 12/2007 | Rittle ............... H04W 8/005 370/338 |
| 2008/0037511 A1 | 2/2008 | Casati et al. |
| 2008/0232344 A1 | 9/2008 | Basu et al. |
| 2009/0016353 A1* | 1/2009 | Li ............... H04W 8/005 370/395.3 |
| 2009/0290511 A1 | 11/2009 | Budampati et al. |
| 2010/0182981 A1 | 7/2010 | Thoukydides et al. |
| 2010/0202436 A1 | 8/2010 | Albert et al. |
| 2010/0272094 A1 | 10/2010 | Byard et al. |
| 2010/0290378 A1* | 11/2010 | Wu ............... H04W 52/0216 370/311 |
| 2011/0128869 A1* | 6/2011 | Coleri Ergen ...... H04W 56/002 370/252 |
| 2011/0170465 A1* | 7/2011 | Tavildar ........... H04W 56/0015 370/311 |
| 2011/0176534 A1* | 7/2011 | Subramanian ........ H04J 3/0685 370/350 |
| 2012/0178485 A1 | 7/2012 | Zeira et al. |
| 2013/0013951 A1 | 1/2013 | Goetz et al. |
| 2013/0044658 A1* | 2/2013 | Zhu ............... H04W 56/0035 370/311 |
| 2013/0182652 A1* | 7/2013 | Tong ............... H04W 72/0446 370/329 |
| 2013/0185373 A1 | 7/2013 | Vandwalle et al. |
| 2013/0230035 A1 | 9/2013 | Grandhi et al. |
| 2013/0279540 A1* | 10/2013 | Hui ............... H04W 72/0406 375/133 |
| 2014/0293991 A1 | 10/2014 | Abraham et al. |
| 2014/0293992 A1 | 10/2014 | Abraham et al. |
| 2014/0321452 A1* | 10/2014 | Choi ............... H04W 8/005 370/350 |
| 2015/0043558 A1* | 2/2015 | Choi ............... H04W 74/0808 370/338 |
| 2015/0223257 A1* | 8/2015 | Wilhelmsson ...... H04W 76/023 455/452.1 |
| 2015/0245305 A1* | 8/2015 | Camps Mur ........ H04W 56/00 370/350 |
| 2016/0088665 A1* | 3/2016 | Kim ............... H04W 76/021 370/329 |

FOREIGN PATENT DOCUMENTS

| | | |
|---|---|---|
| GB | 2421153 A | 6/2006 |
| WO | WO-03049343 A1 | 6/2003 |
| WO | WO-2004075447 A1 | 9/2004 |
| WO | WO-2008124041 A2 | 10/2008 |
| WO | WO-2013036873 A2 | 3/2013 |

OTHER PUBLICATIONS

Taiwan Search Report—TW103110725—TIPO—Oct. 21, 2015.

* cited by examiner

FIG. 6A

| Attribute ID | Length | Timestamp of Next DQW | Timestamp of Next DRW | DQW Duration | DRW Duration | DQW Period | DRW Period | Beacon Duration | Transmit Address |
|---|---|---|---|---|---|---|---|---|---|
| 602 | 604 | 606 | 608 | 610 | 612 | 614 | 616 | 618 | 620 |
| 1 | 2 | 8 | 8 | 2 | 2 | 2-8 Bytes | 2-8 Bytes | 2-8 Bytes | 6 |

Octets

| Attribute ID | Length | DQW Duration | DRW Duration | DQW Period | DRW Period | Beacon Duration | Transmit Address |
|---|---|---|---|---|---|---|---|
| 652 | 654 | 656 | 658 | 660 | 662 | 664 | 666 |
| 1 | 2 | 2 | 2 | 2-8 Bytes | 2-8 Bytes | 2-8 Bytes | 6 |

Octets

650

SYSTEMS AND METHODS FOR SYNCHRONIZATION WITHIN A NEIGHBORHOOD AWARE NETWORK

CROSS REFERENCE TO RELATED APPLICATIONS

This application claims priority under 35 U.S.C. §119(e) to U.S. Provisional Patent Application No. 61/805,858 entitled "SYSTEMS AND METHODS FOR SYNCHRONIZATION WITHIN A NEIGHBORHOOD AWARE NETWORK" filed on Mar. 27, 2013 the disclosure of which is hereby incorporated by reference in its entirety. The present application further claims priority to U.S. Provisional Patent Application No. 61/810,203 entitled "SYSTEMS AND METHODS FOR SYNCHRONIZATION WITHIN A NEIGHBORHOOD AWARE NETWORK" filed on Apr. 9, 2013 the disclosure of which is hereby incorporated by reference in its entirety. The present application further claims priority to U.S. Provisional Patent Application No. 61/819,112 entitled "SYSTEMS AND METHODS FOR SYNCHRONIZATION WITHIN A NEIGHBORHOOD AWARE NETWORK" filed on May 3, 2013 the disclosure of which is hereby incorporated by reference in its entirety. The present application further claims priority to U.S. Provisional Patent Application No. 61/832,706 entitled "SYSTEMS AND METHODS FOR SYNCHRONIZATION WITHIN A NEIGHBORHOOD AWARE NETWORK" filed on Jun. 7, 2013 the disclosure of which is hereby incorporated by reference in its entirety. The present application further claims priority to U.S. Provisional Patent Application No. 61/833,883 entitled "SYSTEMS AND METHODS FOR SYNCHRONIZATION WITHIN A NEIGHBORHOOD AWARE NETWORK" filed on Jun. 11, 2013 the disclosure of which is hereby incorporated by reference in its entirety. The present application further claims priority to U.S. Provisional Patent Application No. 61/859,668 entitled "SYSTEMS AND METHODS FOR SYNCHRONIZATION WITHIN A NEIGHBORHOOD AWARE NETWORK" filed on Jul. 29, 2013 the disclosure of which is hereby incorporated by reference in its entirety. The present application further claims priority to U.S. Provisional Patent Application No. 61/866,423 entitled "SYSTEMS AND METHODS FOR SYNCHRONIZATION WITHIN A NEIGHBORHOOD AWARE NETWORK" filed on Aug. 15, 2013 the disclosure of which is hereby incorporated by reference in its entirety. The present application further claims priority to U.S. Provisional Patent Application No. 61/888,396 entitled "SYSTEMS AND METHODS FOR SYNCHRONIZATION WITHIN A NEIGHBORHOOD AWARE NETWORK" filed on Oct. 8, 2013 the disclosure of which is hereby incorporated by reference in its entirety.

BACKGROUND

Field

The present application relates generally to wireless communications, and more specifically to systems, methods, and devices for synchronization in a peer-to-peer wireless network.

Background

In many telecommunication systems, communications networks are used to exchange messages among several interacting spatially-separated devices. Networks can be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), a neighborhood aware network (NAN), or personal area network (PAN). Networks also differ according to the switching/routing technique used to interconnect the various network nodes and devices (e.g. circuit switching vs. packet switching), the type of physical media employed for transmission (e.g. wired vs. wireless), and the set of communication protocols used (e.g., Internet protocol suite, SONET (Synchronous Optical Networking), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc. frequency bands. Wireless networks advantageously facilitate user mobility and rapid field deployment when compared to fixed wired networks.

Devices in a wireless network can transmit and/or receive information to and from each other. To carry out various communications, the devices can coordinate according to a protocol. As such, devices can exchange information to coordinate their activities. Improved systems, methods, and devices for coordinating transmitting and sending communications within a wireless network are desired.

SUMMARY

The systems, methods, devices, and computer program products discussed herein each have several aspects, no single one of which is solely responsible for its desirable attributes. Without limiting the scope of this invention as expressed by the claims which follow, some features are discussed briefly below. After considering this discussion, and particularly after reading the section entitled "Detailed Description," it will be understood how advantageous features of this invention include reduced power consumption when introducing devices on a medium.

One aspect of the disclosure provides a method of determining a time for exiting and/or entering low power sleep modes to utilize a discovery window. The method includes determining an earliest possible start time of a discovery window according to a clock at the first device. The method further includes transitioning from a low power sleep mode to a higher power active mode approximately at the determined earliest possible start time, wherein the determined earliest possible start time is based at least in part on a clock drift value associated with the first device and a clock drift value associated with a second device of the wireless network.

Another aspect of the subject matter described in the disclosure provides device for wireless communication. The device includes transceiver circuitry. The device further includes a clock. The device further includes a processor configured to communicate with other wireless communication devices in a wireless network during a discovery window used for timing synchronization between networked devices, determine an earliest possible start time of a discovery window according to the clock, and transition from a low power sleep mode to a higher power active mode approximately at the determined earliest possible start time, wherein the determined earliest possible start time is based at least in part on a maximum clock drift value associated with the first device and a maximum clock drift value associated with a second device.

Another aspect of the subject matter described in the disclosure provides a non-transitory computer-readable medium including code that, when executed, causes a wireless communication device to communicate with other wireless communication devices in a wireless network during a discovery window used for timing synchronization between networked devices. The medium further includes code that, when executed, causes the device to determine an earliest possible start time of a discovery window according to the clock. The medium further includes code that, when executed, causes the device to transition from a low power sleep mode to a higher power active mode approximately at the determined earliest possible start time, wherein the determined earliest possible start time is based at least in part on a maximum clock drift value associated with the first device and a maximum clock drift value associated with a second device.

Another aspect of the subject matter described in the disclosure provides device for wireless communication. The device includes means for determining an earliest possible start time of a discovery window according to a clock at the first device. The device further includes means for transitioning from a low power sleep mode to a higher power active mode approximately at the determined earliest possible start time, wherein the determined earliest possible start time is based at least in part on a clock drift value associated with the first device and a clock drift value associated with a second device.

BRIEF DESCRIPTION OF THE DRAWINGS

FIG. 6A shows an exemplary attribute of a NAN information element (IE) that can be employed within the NAN of FIG. 3.

FIG. 6B shows another exemplary attribute of a NAN information element (IE) that can be employed within the NAN of FIG. 3.

DETAILED DESCRIPTION

Figure 1A:
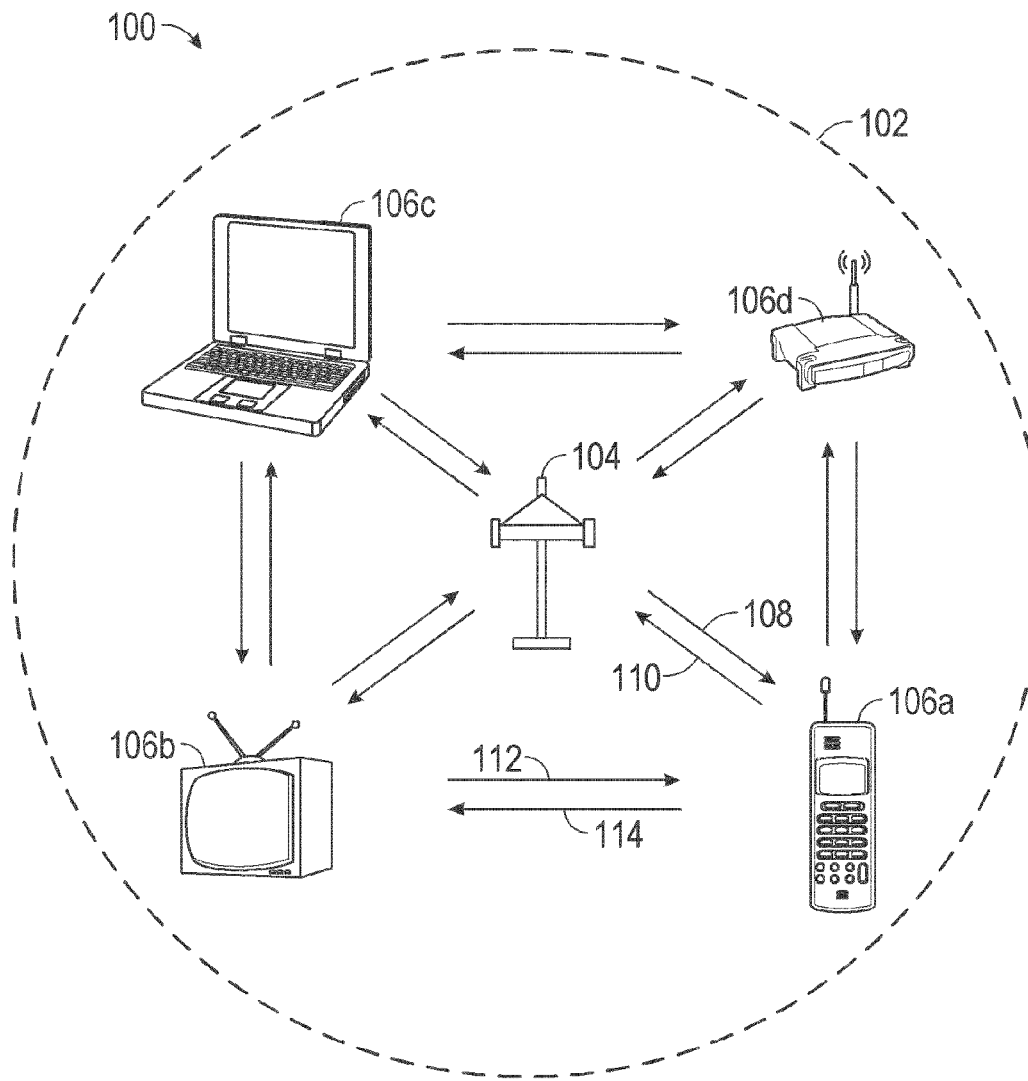
FIG. 1A illustrates an example of a wireless communication system.

The word "exemplary" is used herein to mean "serving as an example, instance, or illustration." Any embodiment described herein as "exemplary" is not necessarily to be construed as preferred or advantageous over other embodiments. Various aspects of the novel systems, apparatuses, and methods are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus can be implemented or a method can be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein can be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Wireless network technologies can include various types of wireless local area networks (WLANs). A WLAN can be used to interconnect nearby devices together, employing widely used networking protocols. However, the various aspects described herein can apply to any communication standard, such as a wireless protocol.

In some implementations, a WLAN includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

As discussed above, one or more nodes of a peer-to-peer network can transmit synchronization messages to coordinate one or more availability windows for communication between nodes of the peer-to-peer network. The nodes can also exchange discovery queries and responses to provide for service discovery between devices operating within the same peer-to-peer or neighborhood aware network. A neighborhood aware network can be considered a peer-to-peer network or an ad-hoc network in some aspects. The nodes repeatedly wake from a sleep state to periodically transmit and/or receive synchronization messages and discovery messages. It would be advantageous if the nodes 106 were able to stay longer in a sleep state to conserve power and not wake from the sleep state to transmit and/or receive synchronization messages on the network. In addition, the transmission and retransmissions of synchronization and discovery messages by the nodes 106 can introduce a large amount of unnecessary overhead to the network In some embodiments, only a subset of nodes can be configured to transmit synchronization messages, for example, in order to reduce network congestion. In some embodiments, a subset of nodes can be designated or elected "master" nodes. For example, nodes that have access to an external power source can be elected as master nodes, whereas nodes that run on battery power may not. In various embodiments, nodes can be designated as one or more different types of master nodes including: discovery master nodes, synchronization master nodes, and/or anchor master nodes.

In some embodiments, one or more discovery master nodes can transmit NAN discovery messages, while other nodes may not. For example, discovery master nodes can be configured to transmit beacons outside of a discovery window. In some embodiments, one or more synchronization master nodes can transmit synchronization messages, while other nodes may not. For example, synchronization master nodes can be configured to transmit beacons within the discovery window.

In some embodiments, one or more anchor master nodes can be preferentially elected as synchronization master nodes and/or discovery master nodes. Anchor nodes can be preset, elected as described herein with respect to master node election, or determined in another manner. NANs having an anchor node can be referred to as anchored NANs and NANs having no anchor node can be referred to as non-anchored NANs.

In some embodiments, one or more nodes in a NAN can elect one or more master nodes based on a dynamically determined or preset master preference value (MPV). For example, nodes with access to an external power source can set their MPV higher (e.g., 10), whereas nodes on battery power can set their MPV lower (e.g., 5). During the election process, nodes having a higher MPV can be more likely to be elected master nodes. In some embodiments, anchor nodes can have a higher MPV than non-anchor nodes, and thus can be more likely to be elected as master nodes.

In some cases, a master node election process can cause unfairness amongst the nodes. For example, master nodes can consume more power and/or processor resources than non-master nodes. In certain implementations, master nodes can become "locked in" as master nodes, with little or no opportunity to pass on the responsibility of transmitting synchronization messages to other nodes. Moreover, one or more nodes in the NAN may not support the master node election process. In some embodiments, nodes that do not support the master node election process can set their MPV to a predetermined or minimum value. Accordingly, it can be beneficial for some nodes to adopt an inclusive, MPV-compatible, synchronization transmission process.

FIG. 1A illustrates an example of a wireless communication system 100. The wireless communication system 100 can operate pursuant to a wireless standard, such as an 802.11 standard. The wireless communication system 100 can include an AP 104, which communicates with STAs. In some aspects, the wireless communication system 100 can include more than one AP. Additionally, the STAs can communicate with other STAs. As an example, a first STA 106a can communicate with a second STA 106b. As another example, a first STA 106a can communicate with a third STA 106c although this communication link is not illustrated in FIG. 1A.

A variety of processes and methods can be used for transmissions in the wireless communication system 100 between the AP 104 and the STAs and between an individual STA, such as the first STA 106a, and another individual STA, such as the second STA 106b. For example, signals can be sent and received in accordance with OFDM/OFDMA techniques. If this is the case, the wireless communication system 100 can be referred to as an OFDM/OFDMA system. Alternatively, signals can be sent and received between the AP 104 and the STAs and between an individual STA, such as the first STA 106a, and another individual STA, such as the second STA 106b, in accordance with CDMA techniques. If this is the case, the wireless communication system 100 can be referred to as a CDMA system.

A communication link can be established between STAs. Some possible communication links between STAs are illustrated in FIG. 1A. As an example, a communication link 112 can facilitate transmission from the first STA 106a to the second STA 106b. Another communication link 114 can facilitate transmission from the second STA 106b to the first STA 106a.

The AP 104 can act as a base station and provide wireless communication coverage in a basic service area (BSA) 102. The AP 104 along with the STAs associated with the AP 104 and that use the AP 104 for communication can be referred to as a basic service set (BSS).

It should be noted that the wireless communication system 100 may not have a central AP 104, but rather can function as a peer-to-peer network between the STAs. Accordingly, the functions of the AP 104 described herein can alternatively be performed by one or more of the STAs.

Figure 1B:
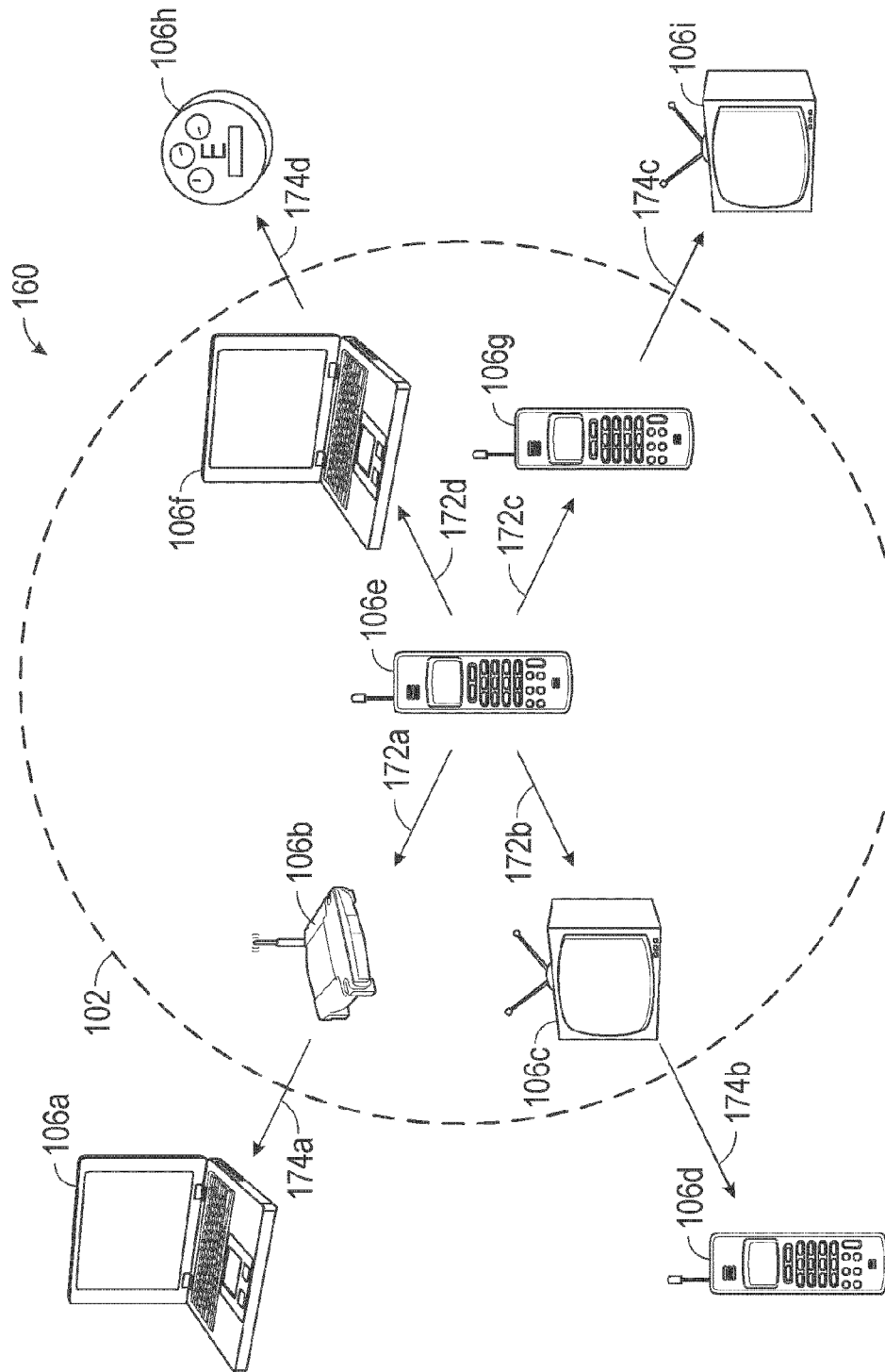
FIG. 1B illustrates another example of a wireless communication system.

FIG. 1B illustrates an example of a wireless communication system 160 that can function as a peer-to-peer network. For example, the wireless communication system 160 in FIG. 1B shows STAs 106a-106i that can communicate with each other without the presence of an AP. As such, the STAs, 106a-106i can be configured to communicate in different ways to coordinate transmission and reception of messages to prevent interference and accomplish various tasks. In one aspect, the networks shown in FIG. 1B can be configured as a "neighborhood aware networking" (NAN). In one aspect, a NAN can refer to a network for communication between STAs that are located in close proximity to each other. In some cases the STAs operating within the NAN can belong to different network structures (e.g., STAs in different homes or buildings as part of independent LANs with different external network connections).

In some aspects, a communication protocol used for communication between nodes on the peer-to-peer communications network 160 can schedule periods of time during which communication between network nodes can occur. These periods of time when communication occurs between STAs 106a-106i can be known as availability windows. An availability window can include a discovery interval or paging interval as discussed further below.

The protocol can also define other periods of time when no communication between nodes of the network is to occur. In some embodiments, nodes can enter one or more sleep states when the peer-to-peer network 160 is not in an availability window. Alternatively, in some embodiments, portions of the stations 106a-106i can enter a sleep state when the peer-to-peer network is not in an availability window. For example, some stations can include networking hardware that enters a sleep state when the peer-to-peer network is not in an availability window, while other hardware included in the STA, for example, a processor, an electronic display, or the like do not enter a sleep state when the peer-to-peer network is not in an availability window.

The peer-to-peer communication network 160 can assign one nodes to be a root node, or can assign one or more nodes to be master nodes. In FIG. 1B, the assigned root node is shown as STA 106e. In peer-to-peer network 160, the root node is responsible for periodically transmitting synchronization signals to other nodes in the peer-to-peer network. The synchronization signals transmitted by root node 160e can provide a timing reference for other nodes 106a-d and 106f-i to coordinate an availability window during which communication occurs between the nodes. For example, a synchronization message 172a-172d can be transmitted by root node 106e and received by nodes 106b-106c and 106f-106g. The synchronization message 172 can provide a timing source for the STAs 106b-c and 106f-106g. The synchronization message 172 can also provide updates to a schedule for future availability windows. The synchronization messages 172 can also function to notify STAs 106b-106c and 106f-106g that they are still present in the peer-to-peer network 160.

Some of the nodes in the peer-to-peer communication network 160 can function as branch synchronization nodes. A branch synchronization node can retransmit both availability window schedule and master clock information received from a root node. In some embodiments, synchronization messages transmitted by a root node can include availability window schedule and master clock information. In these embodiments, the synchronization messages can be retransmitted by the branch synchronization nodes. In FIG. 1B, STAs 106b-106c and 106f-106g are shown functioning as branch-synchronization nodes in the peer-to-peer communication network 160. STAs 106b-106c and 106f-106g receive the synchronization message 172a-172d from root node 106e and retransmit the synchronization message as retransmitted synchronization messages 174a-174d. By retransmitting the synchronization message 172 from root node 106e, the branch synchronization nodes 106b-106c and 106f-106g can extend the range and improve the robustness of the peer-to-peer network 160.

The retransmitted synchronization messages 174a-174d are received by nodes 106a, 106d, 106h, and 106i. These nodes can be characterized as "leaf" nodes, in that they do not retransmit the synchronization message they receive from either the root node 106e or the branch synchronization nodes 106b-106c or 106f-106g. In some embodiments, a plurality of nodes can negotiate transmission of synchronization signals as discussed in greater detail herein.

Synchronization messages, or synchronization frames, can be transmitted periodically. However, periodic transmission of synchronization messages can be problematic for the nodes 106. These problems can be caused by the nodes 106 having to repeatedly wake from a sleep state to periodically transmit and/or receive synchronization messages. It would be advantageous if the nodes 106 were able to stay longer in a sleep state to conserve power and not wake from the sleep state to transmit and/or receive synchronization messages on the network.

When a new wireless device enters a location with a NAN, the wireless device can scan the airwaves for discovery and synchronization information before joining the NAN. It would be advantageous if the information necessary for the STA to join the NAN was quickly accessible to the STA.

In addition, the transmission and retransmissions of synchronization and/or discovery messages by the nodes 106 within a NAN can introduce a large amount of unnecessary overhead to the network.

Figure 2:
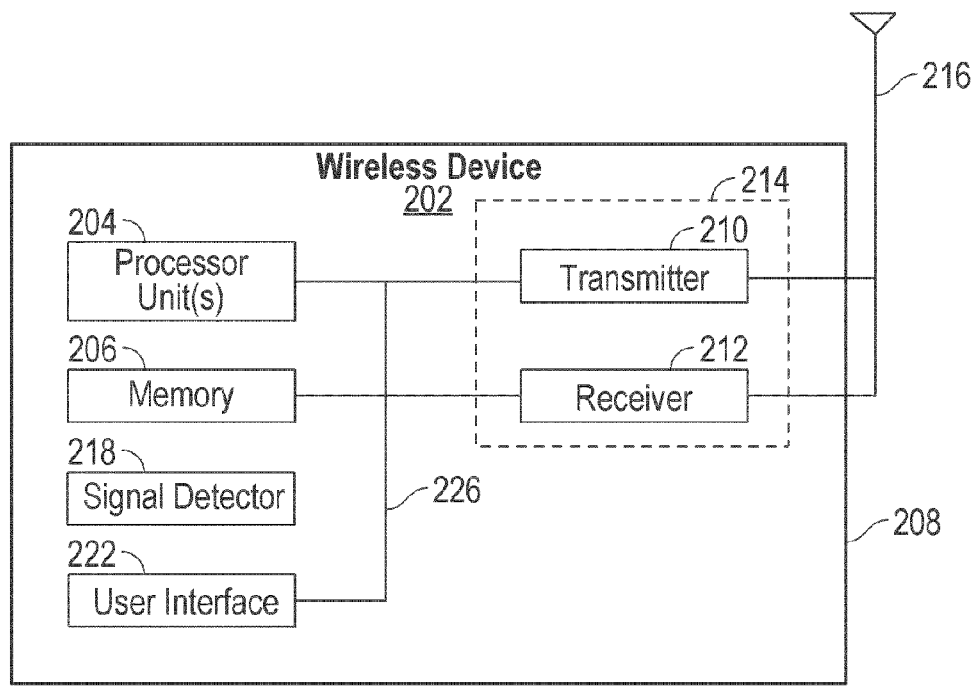
FIG. 2 illustrates a functional block diagram of a wireless device that can be employed within the wireless communication system of FIG. 1.

FIG. 2 illustrates various components that can be utilized in a wireless device 202 that can be employed within the wireless communication system 100 or 160. The wireless device 202 is an example of a device that can be configured to implement the various methods described herein. For example, the wireless device 202 can include the AP 104 or one of the STAs.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can include or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 106, the processor 204 can be configured to process packets of a plurality of different packet types. For example, the processor 204 can be configured to determine the type of packet and to process the packet and/or fields of the packet accordingly. When the wireless device 202 is implemented or used as an AP 104, the processor 204 can also be configured to select and generate one of a plurality of packet types. For example, the processor 204 can be configured to generate a discovery packet including a discovery message and to determine what type of packet information to use in a particular instance.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can include a physical layer data unit (PPDU).

The wireless device 202 can further include a user interface 222 in some aspects. The user interface 222 can include a keypad, a microphone, a speaker, and/or a display. The user interface 222 can include any element or component that conveys information to a user of the wireless device 202 and/or receives input from the user.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

Devices, such as STAs, 106a-106i shown in FIG. 1B, for example, can be used for neighborhood-aware networking, or NANing. For example, various stations within the network can communicate on a device to device (e.g., peer-to-peer communications) basis with one another regarding applications that each of the stations supports. A discovery protocol can be used in a NAN to enable STAs to advertise themselves (e.g., by sending discovery packets) as well as discover services provided by other STAs (e.g., by sending paging or query packets), while ensuring secure communication and low power consumption.

In a neighborhood-aware or NAN, one device, such as STA or wireless device 202, in the network can be designated as the root device or node. In some embodiments, the root device can be an ordinary device, like the other devices in the network, rather than a specialized device such as a router. In NAN, the root node can be responsible for periodically transmitting synchronization messages, or synchronization signals or frames, to other nodes in the network. The synchronization messages transmitted by root node can provide a timing reference for other nodes to coordinate an availability window during which communication occurs between the nodes. The synchronization message can also provide updates to a schedule for future availability windows. The synchronization messages can also function to notify STAs that they are still present in the peer-to-peer network.

In a Neighborhood aware Network (NAN), STA's on the network can use synchronization messages transmitted by a root STA and retransmitted by branch STA's in order to determine availability windows. During these availability windows, STA's in the NAN can be configured to transmit and/or receive messages from other STA's on the network. At other times, STA's, or portions of STA's, on the NAN can be in a sleep state. For example, an STA on a NAN, such as wireless device 202, can enter a sleep state based at least in part on synchronization messages received from a root node. In some embodiments, STA's on a NAN can enter a sleep mode, where one or more elements of the STA can enter a sleep mode, rather than the entire STA. For example, STA 202 can enter a sleep mode where the transmitter 210, receiver 212, and/or transceiver 214 can enter a sleep mode based on synchronization messages received on a NAN. This sleep mode can enable the STA 202 to conserve power or battery life.

Figure 3:
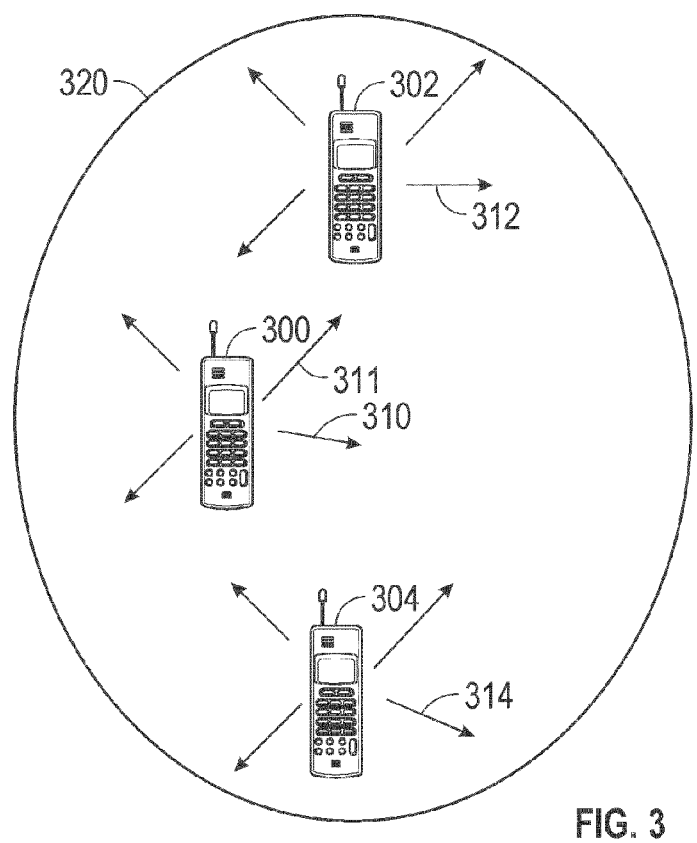
FIG. 3 illustrates an example of a communication system in which aspects of the present disclosure can be employed.

FIG. 3 illustrates an example of a NAN 320 in which aspects of the present disclosure can be employed. A master STA 300 of the network provides synchronization information to the nodes. In this way, the master STA 300 is configured to transmit and receive messages 310, 311, 312, and 314 with the STA's on the NAN 320.

STA's 300, 302, and 304 can be nodes on the NAN 320. As nodes on the NAN 320, STA's 300, 302, and 304 can transmit messages 312, and 314 to other STA's on the network 320. These messages can be transmitted to other STA's during an availability window, during which time each STA is configured to transmit and/or receive transmissions from other STA's on the network 320. For example, STA 302 can transmit messages 312 to STA 304 during an availability window for both STA's, where the availability windows is based in part upon a synchronization message received from a root STA.

Because STA's on the NAN 320 are wireless and can have a finite amount of power between charges, it is advantageous if the STA's do not repeatedly wake from a sleep state to periodically transmit and/or receive synchronization messages between the STA's of the NAN 320. Thus, it would be advantageous if the STA's 300, 302, and 304 were able to stay longer in a sleep state to conserve power and not wake from the sleep state to transmit and/or receive synchronization messages on the network.

Master STA 300 can periodically transmit synchronization messages within the NAN 320. In some embodiments, synchronization messages can indicate the frequency of availability windows for STA's in the network 320, and can further indicate the frequency of synchronization messages and/or the interval until the next synchronization message. In this way, master STA 300 provides synchronization and some discovery functionality to the network 320. Since the master STA may not go to sleep, or can sleep less often than other nodes, the master STA is able to coordinate discovery and timing for the NAN 320 independent of the state of the STA's 302, and 304. In this way, the STA's 302, and 304 rely on the master STA 300 for this functionality and can stay longer in the sleep state to save power.

Figure 4:
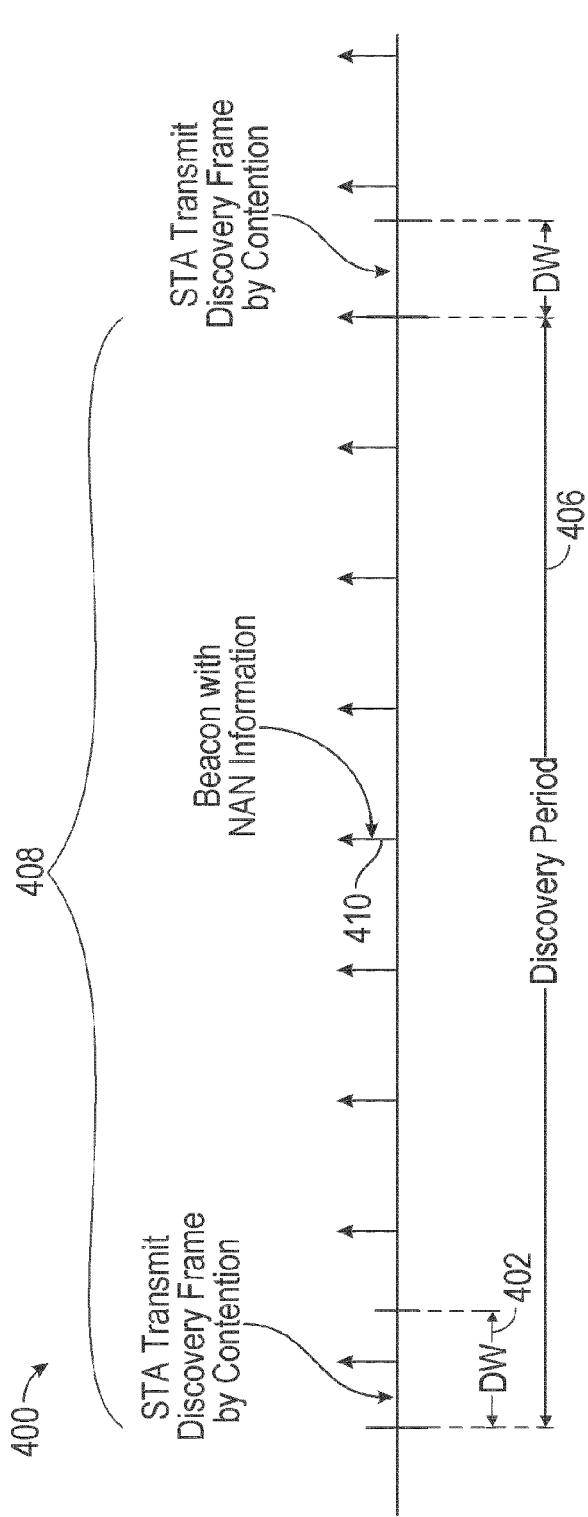
FIG. 4 illustrates an exemplary discovery window structure for an STA to communicate with an AP to discover a NAN in accordance with an exemplary implementation of the invention.

FIG. 4 illustrates an exemplary discovery window structure for an STA to discover the NAN 320 in accordance with an exemplary implementation of the invention. The exemplary discovery window structure 400 can include a discovery window (DW) 402 of time duration 404 and an overall discovery period (DP) 406 interval of time duration 408. In some aspects, communications can occur via other channels as well. Time increases horizontally across the page over the time axis.

During the DW 402, STAs can advertise services through broadcast messages such as discovery packets or discovery frames. STAs can listen to broadcast messages transmitted by other STAs. In some aspects, the duration of DWs can vary over time. In other aspects, the duration of the DW can remain fixed over a period of time. The end of the DW 402 can be separated from the beginning of the subsequent DW by a first remainder period of time as illustrated in FIG. 4.

The overall interval of duration 408 can measure the period of time from the beginning of one DW to the beginning of a subsequent DW as illustrated in FIG. 4. In some embodiments, the duration 408 can be referred to as a discovery period (DP). In some aspects, the duration of the overall interval can vary over time. In other aspects, the duration of the overall interval can remain constant over a period of time. At the conclusion of the overall interval of duration 408, another overall interval can begin, including a DW and the remainder interval. Consecutive overall intervals can follow indefinitely or continue for a fixed period of time. A STA can enter a sleep or power-save mode when the STA is not transmitting or listening or is not expecting to transmit or listen.

Discovery queries are transmitted during the DW 402. STA responses to the transmitted discovery queries are transmitted during the DP 406. As explained below, the allocated time for transmitting responses to the transmitted probe or discovery queries can, for example, overlap with the allocated time for transmitting the discovery queries, be adjacent to the allocated time for transmitting the discovery queries, or be at some time period after the end of the allocated time for transmitting the discovery queries.

The STA which sent the request for a NAN 320 subsequently wakes up to receive a beacon. The STA in the sleep mode or power-save mode can awake or return to normal operation or full power mode at the beginning of the beacon 410 to enable listening by the STA. In some aspects, the STA can awake or return to normal operation or full power mode at other times when the STA expects to communicate with another device, or as a result of receiving a notification packet instructing the STA to awake. The STA can awake early to ensure that the STA receives the beacon 410. The beacon includes an information element, described below, which at least identifies the NAN 320 which is responsive to the probe request of the STA.

The start and end of the DW 402 can be known via numerous methods to each STA desiring to transmit a probe or discovery query. In some aspects, each STA can wait for a beacon. The beacon can specify the start and end of the DW 402.

Figure 5A:
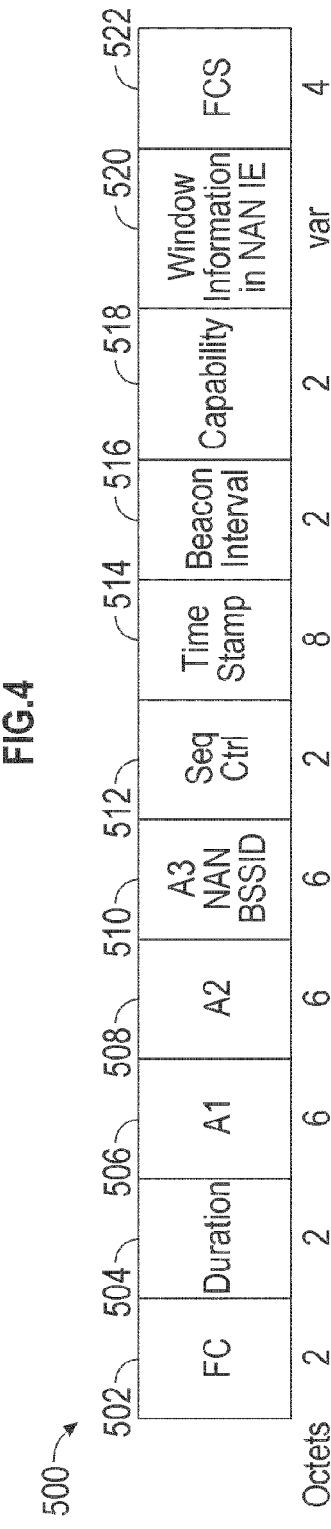
FIG. 5A shows an exemplary structure of a media access control (MAC) frame.

FIG. 5A shows an exemplary structure of a media access control (MAC) frame 500. In some aspects, the media access control frame (MAC) 500 can be utilized for the beacon signal 410 discussed above. As shown, the MAC frame 500 includes 11 different fields frame control (FC) field 502 a duration/identification (dur) field 504, a receiver address (A1) field 506, a transmitter address (A2) field 508, a destination address (A3) field 510, which in some aspects can indicate a NAN BSSID, a sequence control (sc) field 512, a timestamp field 514, a beacon interval field 516, a capability field 518, an information element 520 including window information, and a frame check sequence (FCS) field 522. The fields 502-522 include a MAC header in some aspects. Each field can include one or more sub-fields or fields. For example, frame control field 502 of media access control header 500 can include multiple subfields, such as a protocol version, type field, subtype field, and other fields. Moreover, a person having ordinary skill in the art will appreciate that the various fields described herein can be rearranged, resized, some fields can be omitted, and additional fields can be added.

In some aspects, the NAN BSSID field 510 can indicate a cluster of NAN devices. In another embodiment, each NAN can have a different (for example, pseudorandom) NAN BSSID 510. In an embodiment, the NAN BSSID 510 can be based on a service application. For example, a NAN created by Application A can have a BSSID 510 based on an identifier of Application A. In some embodiments, the NAN BSSID 510 can be defined by a standards-body. In some embodiments, the NAN BSSID 510 can be based on other contextual information and/or device characteristics such as, for example, a device location, a server-assigned ID, etc. In one example, the NAN BSSID 510 can include a hash of the latitude and longitude location of the NAN. The NAN BSSID field 510 shown is six octets long. In some implementations, NAN BSSID field 510 can be four, five, or eight octets long. In some embodiments, the AP 104 can indicate the NAN BSSID 510 in an information element.

In various embodiments, the frame 500, or another discovery frame, can include the MPV. In an embodiment, the FC field 502 can include the MPV. In an embodiment, the A2 field 508 can include the MPV. In various examples, the entire A2 field 508 can include the MPV, one or more most-significant-bits (MSBs) or least-significant-bits (LSBs) can be replaced with the MPV, etc. In an embodiment, the NAN-BSSID field 510 can include the MPV. In various examples, the entire NAN-BSSID field 510 can include the MPV, one or more most-significant-bits (MSBs) or least-significant-bits (LSBs) can be replaced with the MPV, etc. In an embodiment, the capability field 518 can include the MPV. In an embodiment, one or more information elements (IEs) 520 can include the MPV, for example as an attribute. In one example, the IE 600, described below with respect to FIG. 6A, can include the MPV, although other IEs can include the MPV. In various embodiments described herein, fields that include the MPV can alternatively include an indication or representation of the MPV rather than the MPV itself.

Figure 5B:
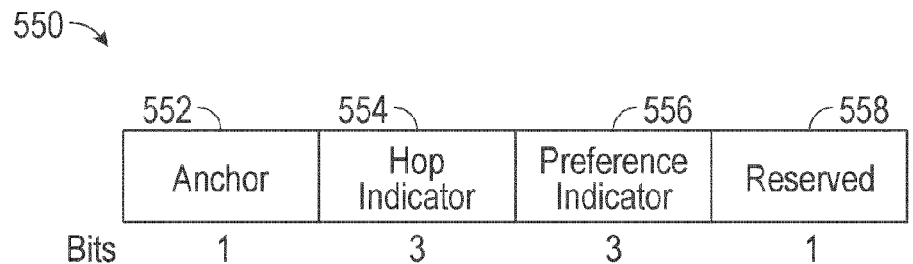
FIG. 5B shows an exemplary structure of a master preference value (MPV).

FIG. 5B shows an exemplary structure of a master preference value (MPV) 550. In some aspects, the MPV 550 can be utilized for election of a master node and/or processing of NAN messages, for example as described in herein with respect to FIGS. 11-13. As shown, the MPV 550 includes an anchor flag 552, a hop indicator 554, a preference indicator 556 and a reserved bit 558. A person having ordinary skill in the art will appreciate that the various fields described herein can be rearranged, resized, some fields can be omitted, and additional fields can be added.

The anchor flag 552 serves to indicate whether the STA 106 transmitting the MPV is an anchor node. As shown, the anchor flag 552 is one bit long. In various other embodiments, the anchor flag 552 can be another length such as, for example, two or three bits long. In some embodiments, the anchor flag 552 can be variable length.

In an embodiment, the STA 106 can set the anchor flag 552 to 0b1 when the STA 106 is an anchor node. The STA 106 can set the anchor flag 552 to 0b0 when the STA 106 is not an anchor node. Thus, the STA 106 can set the anchor flag 563 to 0b0 in embodiments where the STA 106 is in a non-anchored NAN. Accordingly, anchor nodes can have a higher MPV 550 than non-anchor nodes. Thus, in some embodiments, anchor nodes can be given preference in master node election and/or NAN message processing.

The hop indicator 554 serves to indicate a hop distance of the transmitting STA 106 to the nearest anchor node. For example, in anchored NANs, a node that receives one or more messages from an anchor node (i.e., a node that can "hear" an anchor node) can set the hop indicator 554 to 0b111. In an embodiment, a node that does not receive any messages from an anchor node (i.e., a node that cannot "hear" an anchor node) can set the hop indicator 554 to the highest hop indicator 554 received from any node, minus one. For example, a node that has received a highest hop indicator 554 of 0b111 from another node can set its hop indicator 554 to 0b110, a node that has received a highest hop indicator 554 of 0b110 from another node can set its hop indicator 554 to 0x101, and so on.

In various other embodiments the hop indicator 554 can be incremented rather than decremented as hop distance increases. In some embodiments, anchor nodes can set the hop indicator 554 to all ones or 0x111. In some embodiments, a node that receives one or more messages from an anchor node (i.e., a node that can "hear" an anchor node) can set the hop indicator 554 to the hop indicator 554 of the anchor node, minus one. For example, where an anchor node sets a hop indicator 554 to 0x111, a non-anchor node that can hear the anchor node can set its hop indicator 554 to 0x110. In some embodiments, STAs 106 in a non-anchored NAN can set the hop indicator 554 to zero or 0b000. As shown, the hop indicator 554 is three bits long. In various other embodiments, the hop indicator 554 can be another length such as, for example, two or four bits long. In some embodiments, the hop indicator 554 can be variable length.

The preference indicator 556 serves to indicate a preference of the STA 106 for becoming a master node. As shown, the preference indicator 556 is three bits long. In various other embodiments, the preference indicator 556 can be another length such as, for example, two or four bits long. In some embodiments, the preference indicator 556 can be variable length. The STA 106 can set the preference indicator 556 based on one or more device characteristics, capabilities, and/or features.

In various embodiments, the STA 106 can increase and/or decrease the preference indicator 556, subject to a maximum and minimum value, based on one or more of: an RF characteristic (e.g., link speed, signal strength, etc.), a power source, a power consumption rate, a remaining battery power, a clock type, a clock accuracy, a processor load, a user interaction, a preset value, etc. For example, the STA 106 can increment the preference indicator 556 when the STA 106 is plugged into mains power source or when it has synchronized its clock signal via global positioning system (GPS). As another example, the STA 106 can decrement the preference indicator 556 and/or refrain from incrementing the preference indicator 556 when the STA 106 has a high processor load and/or has an RF link with an error rate above a threshold.

Figure 5C:
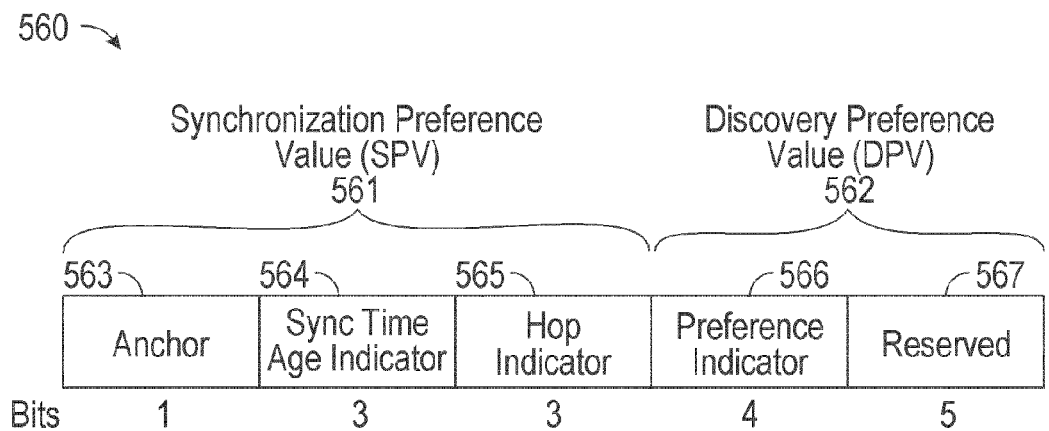
FIG. 5C shows another exemplary structure of a master preference value (MPV).

FIG. 5C shows an exemplary structure of a master preference value (MPV) 560. In some aspects, the MPV 560 can be utilized for election of a master node and/or processing of NAN messages, for example as described in herein with respect to FIGS. 11-13. As shown, the MPV 560 includes a synchronization preference value (SPV) 561 and a discovery preference value (DPV) 562. A person having ordinary skill in the art will appreciate that the various fields described herein can be rearranged, resized, some fields can be omitted, and additional fields can be added.

The synchronization preference value 561 indicates a preference or suitability for a transmitting node to become a master node. As shown, the synchronization preference value 561 includes an anchor flag 563, a synchronization time age indicator (STAI) 564, and a hop indicator 565. As shown, the synchronization preference value 561 is seven bits long. In various other embodiments, the synchronization preference value 561 can be another length such as, for example, four or eleven bits long. In some embodiments, the synchronization preference value 561 can be variable length. A person having ordinary skill in the art will appreciate that the various fields described herein can be rearranged, resized, some fields can be omitted, and additional fields can be added.

The anchor flag 563 serves to indicate whether the STA 106 transmitting the MPV is an anchor node. As shown, the anchor flag 563 is one bit long. In various other embodiments, the anchor flag 563 can be another length such as, for example, two or three bits long. In some embodiments, the anchor flag 563 can be variable length.

In an embodiment, the STA 106 can set the anchor flag 563 to 0b1 when the STA 106 is an anchor node. The STA 106 can set the anchor flag 563 to 0b0 when the STA 106 is not an anchor node. Thus, the STA 106 can set the anchor flag 563 to 0b0 in embodiments where the STA 106 is in a non-anchored NAN. Accordingly, anchor nodes can have a higher MPV 560 than non-anchor nodes. Thus, in some embodiments, anchor nodes can be given preference in master node election and/or NAN message processing.

The synchronization time age indicator 564 serves to indicate a measure of how much time has passed since the transmitting node last synched its clock to an anchor node clock. As shown, the synchronization time age indicator 564 is three bits long. In various other embodiments, the synchronization time age indicator 564 can be another length such as, for example, two or four bits long. In some embodiments, synchronization time age indicator 564 can be variable length.

In an embodiment, the STA 106 can set the synchronization time age indicator 564 to 0b111 when the STA 106 is an anchor node. When the STA 106 is not an anchor node, the STA 106 can receive a beacon (including a synchronization time age indicator) from another node (referred to herein as the "synchronization node"), and can synchronize its clock based on the beacon. The STA 106 can set the synchronization time age indicator 564 to the synchronization time age indicator in the beacon received from the synchronization node, minus a number of discovery windows that have elapsed since the beacon was received.

For example, a STA 106 that receives a beacon from an anchor node in a current discovery window can set its synchronization time age indicator 564 to 0b111−0b0=0b111. In the next discovery window, the STA 106 can set its synchronization time age indicator 564 to 0b111−0b1=0b110, and so on. Accordingly, non-anchor STAs 106 that have recently synchronized their clocks with an anchor node can have a relatively higher MPV 560. Thus, in some embodiments, STAs 106 with relatively up-to-date clocks can be given preference in master node election and/or NAN message processing. In embodiments where the STA 106 is in a non-anchored NAN, the STA 106 can set the synchronization time age indicator 564 to zero or 0b000.

The hop indicator 565 serves to indicate a hop distance of the transmitting STA 106 to the nearest anchor node. For example, in anchored NANs, a node that receives one or more messages from an anchor node (i.e., a node that can "hear" an anchor node) can set the hop indicator 565 to 0b111. In an embodiment, a node that does not receive any messages from an anchor node (i.e., a node that cannot "hear" an anchor node) can set the hop indicator 565 to the highest hop indicator 565 received from any node, minus one. For example, a node that has received a highest hop indicator 565 of 0b111 from another node can set its hop indicator 565 to 0b110, a node that has received a highest hop indicator 565 of 0b110 from another node can set its hop indicator 565 to 0x101, and so on.

In various other embodiments the hop indicator 565 can be incremented rather than decremented as hop distance increases. In some embodiments, anchor nodes can set the hop indicator 565 to all ones or 0x111. In some embodiments, a node that receives one or more messages from an anchor node (i.e., a node that can "hear" an anchor node) can set the hop indicator 565 to the hop indicator 565 of the anchor node, minus one. For example, where an anchor node sets a hop indicator 565 to 0x111, a non-anchor node that can hear the anchor node can set its hop indicator 565 to 0x110. In some embodiments, STAs 106 in a non-anchored NAN can set the hop indicator 565 to zero or 0b000. As shown, the hop indicator 565 is three bits long. In various other embodiments, the hop indicator 565 can be another length such as, for example, two or four bits long. In some embodiments, the hop indicator 565 can be variable length.

The discovery preference value 562 indicates a preference or suitability for a transmitting node to become a master node. As shown, the discovery preference value 562 includes a preference indicator 566 and five reserved bits 567. As shown, the discovery preference value 562 is nine bits long. In various other embodiments, the discovery preference value 562 can be another length such as, for example, three or four bits long. In some embodiments, the discovery preference value 562 can be variable length. A person having ordinary skill in the art will appreciate that the various fields described herein can be rearranged, resized, some fields can be omitted, and additional fields can be added.

The preference indicator 566 serves to indicate a preference of the STA 106 for becoming a master node. As shown, the preference indicator 566 is four bits long. In various other embodiments, the preference indicator 566 can be another length such as, for example, three or five bits long. In some embodiments, the preference indicator 566 can be variable length. The STA 106 can set the preference indicator 566 based on one or more device characteristics, capabilities, and/or features.

In various embodiments, the STA 106 can increase and/or decrease the preference indicator 566, subject to a maximum and minimum value, based on one or more of: an RF characteristic (e.g., link speed, signal strength, etc.), a power source, a power consumption rate, a remaining battery power, a clock type, a clock accuracy, a processor load, a user interaction, a preset value, etc. For example, the STA 106 can increment the preference indicator 566 when the STA 106 is plugged into mains power source or when it has synchronized its clock signal via global positioning system (GPS), or using a Wide Area Network timing source. As another example, the STA 106 can decrement the preference indicator 566 and/or refrain from incrementing the preference indicator 566 when the STA 106 has a high processor load and/or has an RF link with an error rate above a threshold.

FIG. 6A shows an exemplary attribute of a NAN information element (IE) 600 that can be employed within the NAN 320 of FIG. 3. In various embodiments, any device described herein, or another compatible device, can transmit the attribute of the NAN IE 600 such as, for example, the AP 104 (FIG. 3). One or more messages in the wireless NAN 320 can include the attribute of the NAN IE 600 such as, for example, the beacon 410. In some aspects, the NAN information element 600 can be included in MAC header 500 field 520 as described above.

As shown in FIG. 6A, the attribute of the NAN IE 600 includes an attribute ID 602, a length field 604, a Timestamp of a next Discovery Query Window (DQW) field 606, a Timestamp of the next Discovery Response Window (DRW) field 608, a Discovery Query Window (DQW) duration field 610, a Discovery Response Window (DRW) duration field 612, a DQW Period field 614, a DRW Period field 616, a Beacon Window field 618, and a transmit address field 620. A person having ordinary skill in the art will appreciate that the attribute of the NAN IE 600 can include additional fields, and fields can be rearranged, removed, and/or resized.

The attribute identifier field 602 shown is one octet long. In some implementations, the attribute identifier field 602 can be two, five, or twelve octets long. In some implementations, the attribute identifier field 602 can be of variable length, such as varying length from signal to signal and/or as between service providers. The attribute identifier field 602 can include a value which identifies the element as an attribute of the NAN IE 600.

The length field 604 can be used to indicate the length of the attribute of the NAN IE 600 or the total length of subsequent fields. The length field 604 shown in FIG. 6A is two octets long. In some implementations, the length field 604 can be one, five, or twelve octets long. In some implementations, the length field 604 can be of variable length, such as varying length from signal to signal and/or as between service providers.

The Timestamp of next DQW field 606 can indicate a start time of the next discovery query window (for example, the start of the next discovery period 406 described above with respect to FIG. 4). In various embodiments, the start time can be indicated using an absolute timestamp or a relative timestamp. The Timestamp of next DQR field 608 can indicate a start time of the next discovery query response (for example, the start of the next discovery query response period described below with respect to FIGS. 7-9). In various embodiments, the start time can be indicated using an absolute timestamp or a relative timestamp.

The DQW duration field 610 can indicate a duration of the DQW (for example, the duration of the DQW described below with respect to FIG. 7-9). In various embodiments, the DQW duration field 610 can indicate the duration of the DQW in ms, µs, time units (TUs), or another unit. In some embodiments, time units can be 1024 µs. The DQW duration field 610 shown is two octets long. In some implementations, DQW duration field 610 can be four, six, or eight octets long.

The DRW duration field 612 can indicate a duration of the DRW (for example, the duration of the DRW described below with respect to FIG. 7-9). In various embodiments, the DRW duration field 612 can indicate the duration of the DRW in ms, µs, time units (TUs), or another unit. In some embodiments, time units can be 1024 µs. The DRW duration field 612 shown is two octets long. In some implementations, DRW duration field 612 can be four, six, or eight octets long.

In some embodiments, the DQW period field 614 can indicate a length of the DQW (described below with respect to FIGS. 7-9). In various embodiments, the DQW period field 614 can indicate the length of the DQW in ms, µs, time units (TUs), or another unit. In some embodiments, time units can be 1024 µs. The DQW period field 614 shown is between two and eight octets long. In some implementations, the DQW period field 614 can be two, four, six, or eight octets long.

In some embodiments, the DRW period field 616 can indicate a length of the DRW (described below with respect to FIGS. 7-9). In various embodiments, the DRW period field 616 can indicate the length of the DRW in ms, µs, time units (TUs), or another unit. In some embodiments, time units can be 1024 µs. The DRW period field 616 shown is between two and eight octets long. In some implementations, the DRW period field 616 can be two, four, six, or eight octets long.

The Beacon Duration field 618 can indicate a duration of a Beacon Window (for example, the duration of the Beacon Window described below with respect to FIGS. 7-9). In various embodiments, the Beacon Duration field 618 can indicate the duration of the Beacon Window in ms, µs, time units (TUs), or another unit. In some embodiments, time units can be 1024 µs. The Beacon Window field 618 shown is between two and eight octets long. In some implementations, Beacon Window field 618 can be four, six, or eight octets long.

The Transmit Address field 620 indicates a network address of a node transmitting the NAN IE 600. In some aspects, the A3 field 510 of the MAC header 500 discussed above with respect to FIG. 5A will instead be set to a NAN BSSID. Therefore, NAN IE 600 provides the transmitter address field 620 to enable receivers to determine the network address of the transmitter.

FIG. 6B shows another exemplary attribute of a NAN information element (IE) 650 that can be employed within the NAN 320 of FIG. 3. In various embodiments, any device described herein, or another compatible device, can transmit the attribute of the NAN IE 650 such as, for example, the AP 104 (FIG. 3). One or more messages in the wireless NAN 320 can include the attribute of the NAN IE 650 such as, for example, the beacon 410. In some aspects, the NAN information element 650 can be included in MAC header 500 field 520 as described above.

NAN information element 650 differs from NAN information element 600 in that the discovery query window timestamp and the discovery query response window timestamp have been removed from NAN information element 650 relative to NAN information element 600. In some aspects, a receiver of NAN information element 650 can determine a discovery query window start time as the time when a local clock reference that is synchronized to a NAN clock reference is evenly divided by the DQW period field 660 (Station Clock mod DQW period=0). Similarly, the discovery response window start time can be determined in some aspects based on when a local clock synchronized to a NAN clock reference is evenly divided by the DRW period field 662 (Station Clock mod DRW period=0). Note that these example methods of determining a discovery query window or discovery response window start time are similar to the method used to determine a beacon window start time, which can be found in some aspects as Station Clock mod Beacon Interval=0).

Figure 7:
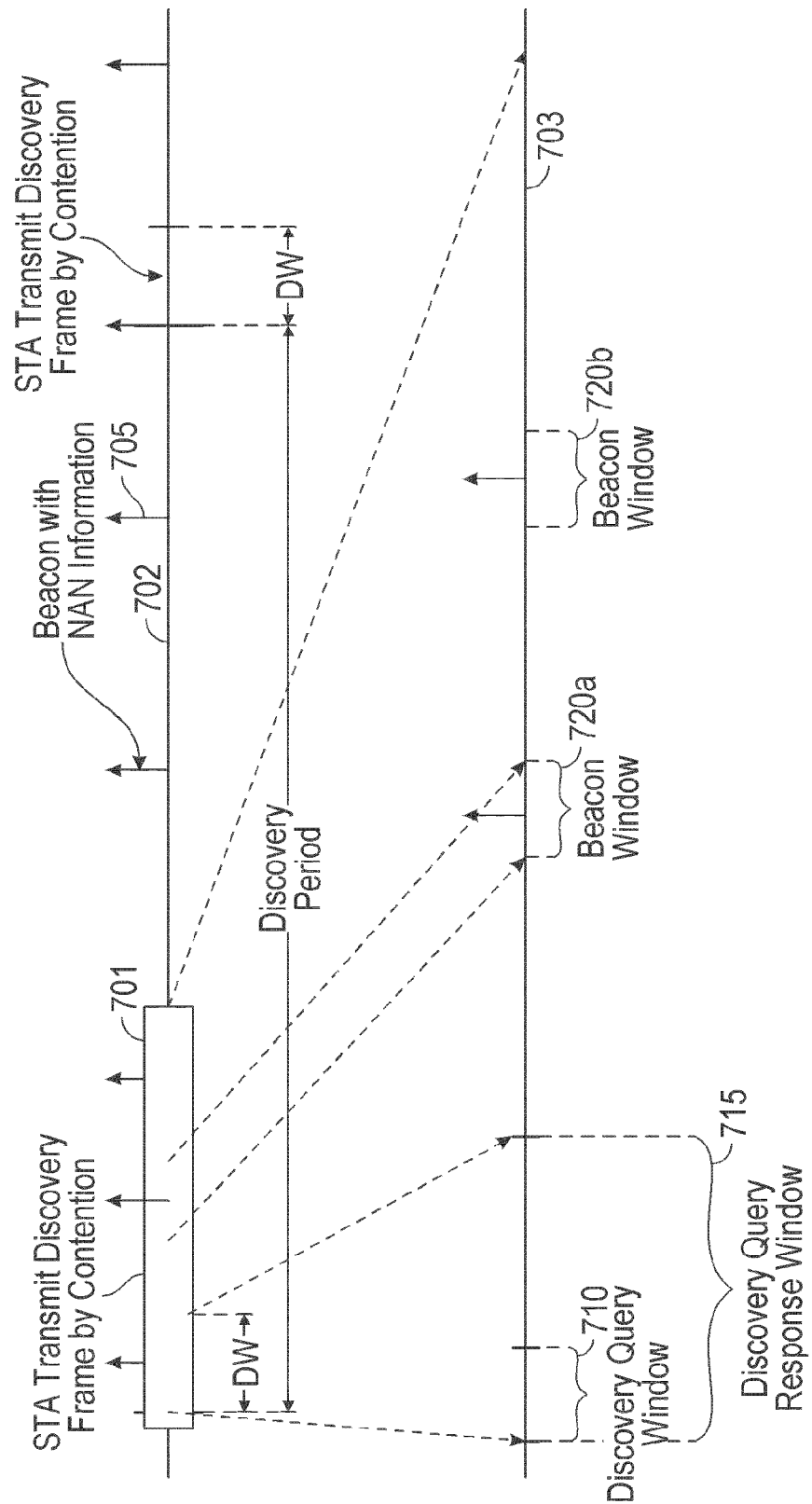
FIG. 7 is a timing diagram illustrating one embodiment of a beacon window, discovery query window, and discovery query response window.

FIG. 7 is a timing diagram illustrating one embodiment of a beacon window, discovery query window, and discovery query response window. A portion 701 of the timeline 702 is expanded as the lower timeline 703. Timeline 702 shows a series of beacon signals 705. Shown on the expanded timeline 703 are a discovery window 710 and a discovery query response window 715. Expanded timeline 703 also shows that one or more beacon windows 720a-b can occur within the discovery period. In an embodiment, sync frames can be transmitted during the beacon window. In some embodiments, sync frames can be transmitted at a specific target beacon transmission time (TBTT) within the beacon window. In the illustrated embodiment, the discovery query window 710 is completely within the discovery query response window 715.

Figure 8:
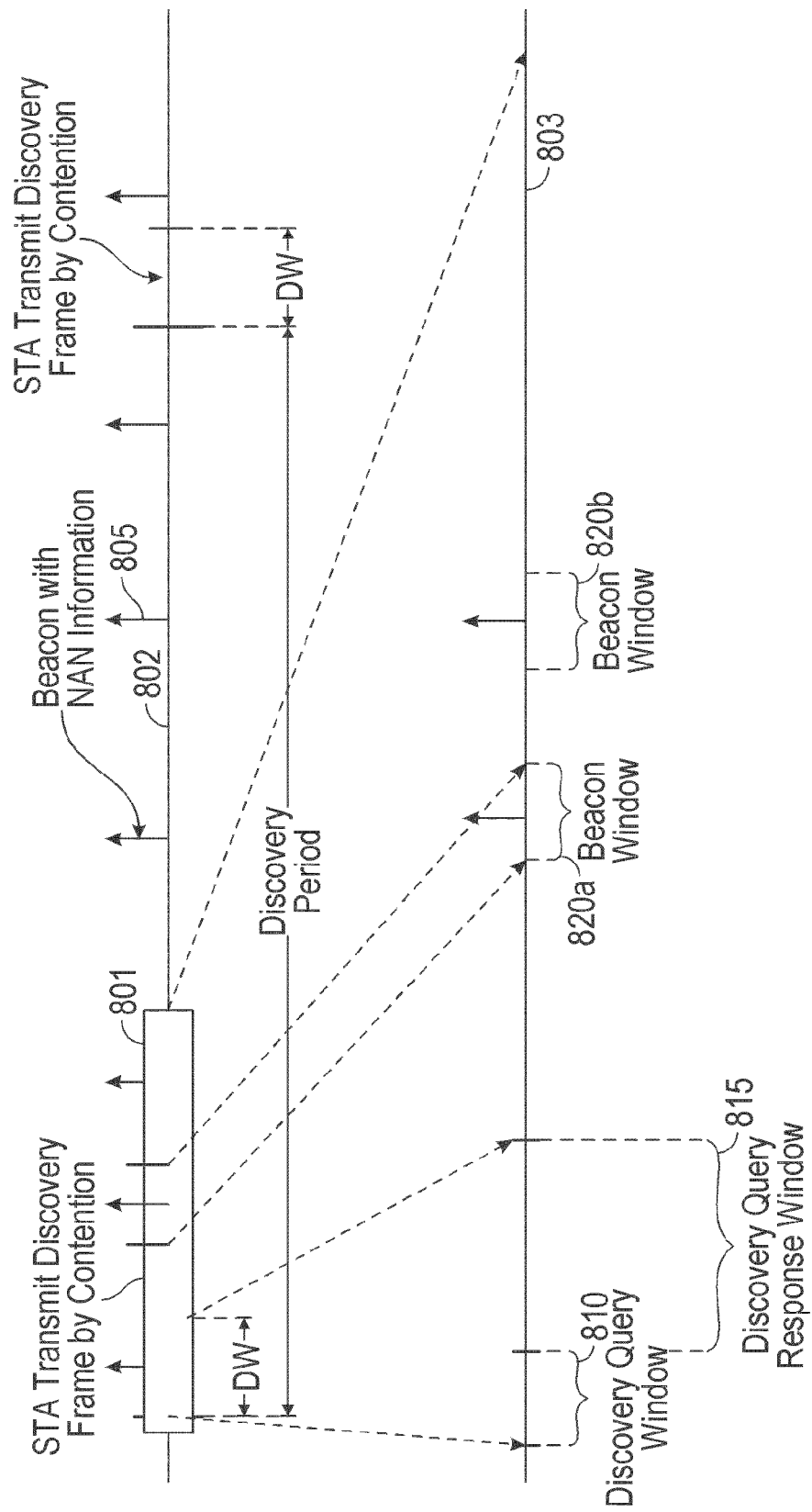
FIG. 8 is a timing diagram illustrating one embodiment of a beacon window, discovery query window, and discovery query response window.

FIG. 8 is a timing diagram illustrating one embodiment of a beacon window, discovery query window, and discovery query response window. A portion 801 of the timeline 802 is expanded as the lower timeline 803. Timeline 802 shows a series of beacon signals 805. Shown on the expanded timeline 803 are a discovery window 810 and a discovery query response window 815. Expanded timeline 803 also shows that one or more beacon windows 820a-b can occur within the discovery period. In the illustrated embodiment of FIG. 8, the discovery query window 810 does not overlap the discovery query response window 815. Instead, the discovery query response window 815 immediately follows the end of the discovery query window 810.

Figure 9:
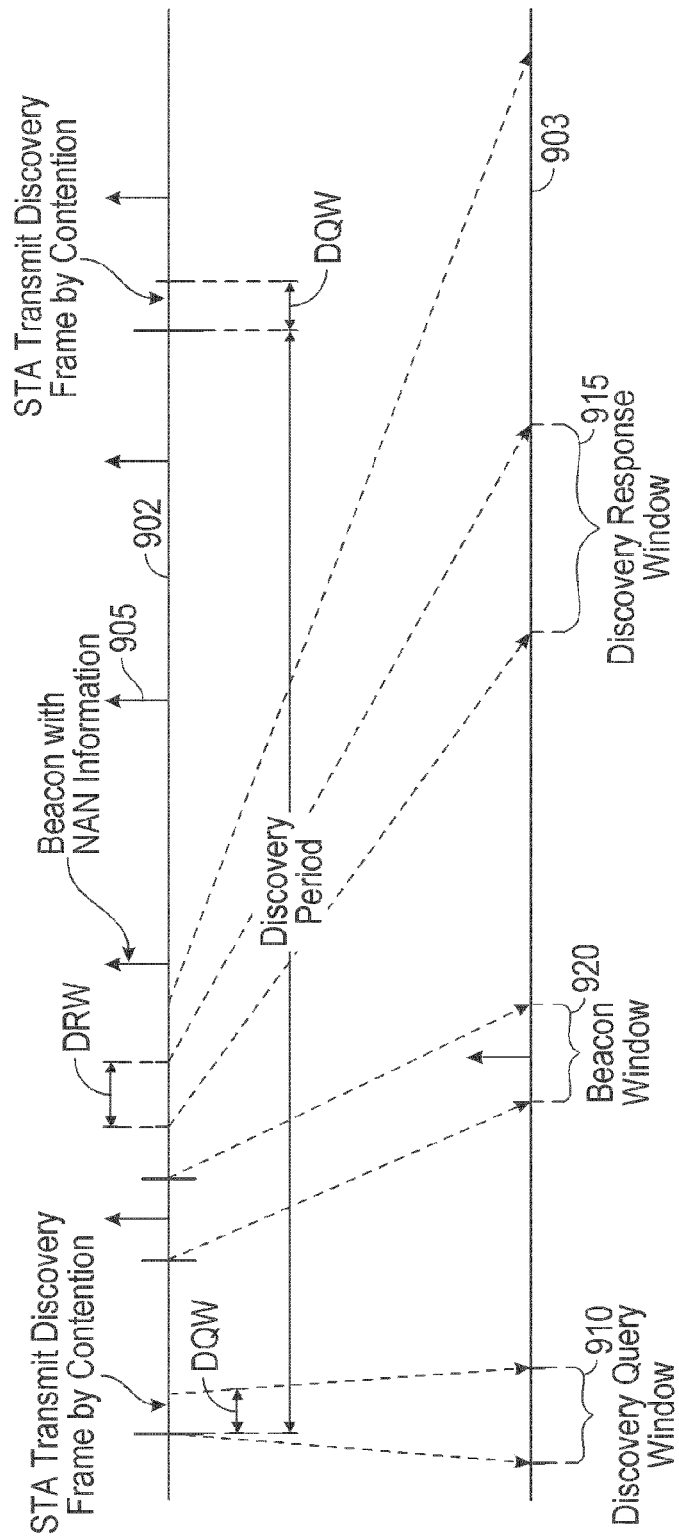
FIG. 9 is a timing diagram illustrating one embodiment of a beacon window, discovery query window, and discovery query response window.

FIG. 9 is a timing diagram illustrating one embodiment of a beacon window, discovery query window, and discovery query response window. A portion of timeline 902 is expanded as the lower timeline 903. Timeline 902 shows a series of beacon signals 905. Shown on the expanded timeline 903 are a discovery window 910 and a discovery query response window 915. Expanded timeline 903 also shows that one or more beacon windows 920 can occur within the discovery period. In the illustrated embodiment of FIG. 9, the timing of the discovery query window 910 is unrelated to the timing of the discovery query response window 915.

Certain aspects described herein are directed to devices and methods for synchronization of clock signals of STAs operating in a peer-to-peer fashion. In aspect, at least some of the STAs may transmit the current time value of their clock signals to the other STAs. For example, in accordance with certain embodiments, STAs may periodically transmit a "sync" frame that carries a time stamp. The current time value may correspond to a time-stamp value. For example, in one embodiment, a discovery message as described above may serve as the 'sync' frame and carry a current time value of a STA 106. In addition to the time stamp, the sync frame may also include information regarding the discovery interval and discovery period. For example, the sync frame may include the schedule of the discovery interval and discovery period. Upon receipt of a sync frame, a STA 106 that may be new to the network may determine the time and the discovery interval/discovery period schedule in the network. STAs already communicating within the network may maintain synchronization while overcoming clock drift as described below. Based on the sync message, STAs may enter and exit a network (e.g., a NAN) without losing synchronization. Furthermore, the synchronization messages described herein may allow for avoiding excessive power drain and the STAs in the network may share the burden of messaging for synchronization. Furthermore, certain embodiments allow for a low messaging overhead (e.g., as only a few devices may send sync frames in every discovery period as will be described below). As described above with reference to FIG. 4, for example, discovery packets within a NAN are transmitted during a discovery interval 402 that occurs every discovery period 406. As such, sync messages may be sent during a discovery interval 402 for certain discovery periods.

Figure 10:
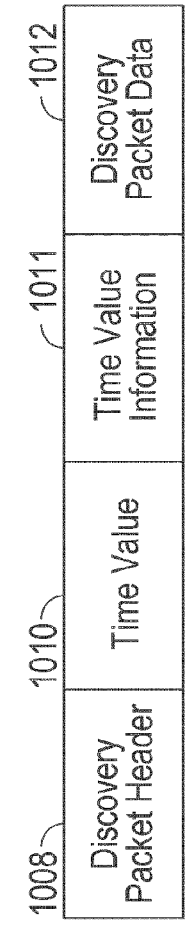
FIG. 10 illustrates a message that can include a time value for synchronization.

FIG. 10 illustrates a message 1000 that can include a time value for synchronization. As described above, in some embodiments, the message 1000 can correspond to a discovery message. The message 1000 can include a discovery packet header 1008. The message can further include 1010 a time value for synchronization 1010. In some embodiments, the discovery packet header 1008 can include the time value 1010. The time value can correspond to a current time value of a clock signal of a STA 106 transmitting the message 1000. In addition the message 1000 can include time value information 1011 that can relate to the accuracy of the time value or how it might be used in synchronization. In an embodiment, the time value information 1011 can include the MPV of the STA 106. The message 1000 can further include discovery packet data 1012. While FIG. 10 shows a discovery message serving as the sync message, it should be appreciated that according to other embodiments, the sync message can be sent apart from the discovery message. Moreover, a person having ordinary skill in the art will appreciate that the various fields described herein can be rearranged, resized, some fields can be omitted, and additional fields can be added.

It should be appreciated that a STA 106 may not transmit a sync frame every discovery interval. Rather, a probability value (P_sync), as is further described below, may be used to determine whether the STA 106 transmits and/or prepares a sync frame. As such, while in some embodiments, at least some sync frames are sent for every discovery interval, in certain embodiments, not all the STAs participating in the NAN transmit a sync frame for every discovery interval. Probabilistic frame preparation and/or transmission can allow for reduced power consumption in transmitting sync frames while still enabling synchronization.

Figure 11:
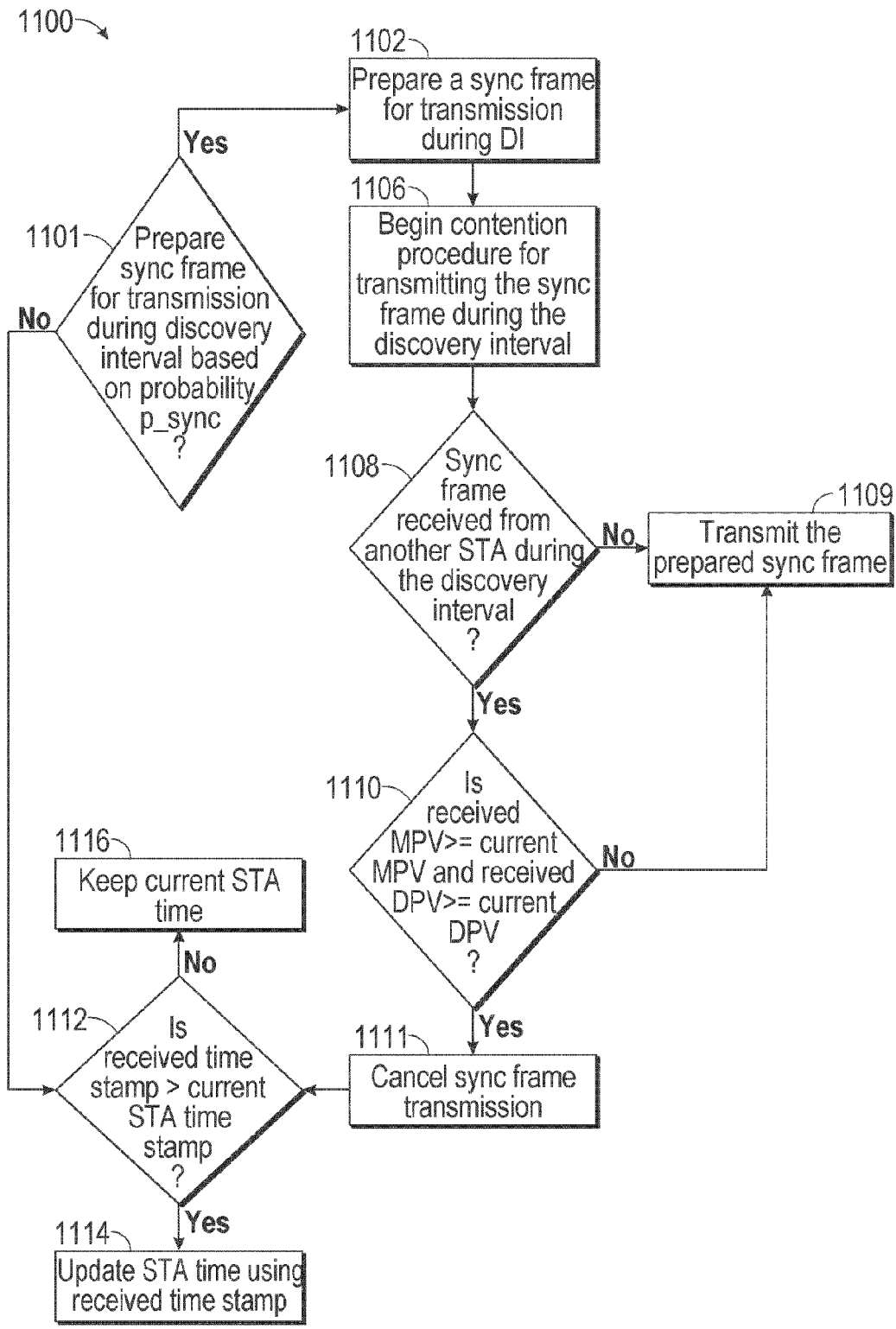
FIG. 11 shows a flowchart of a method of transmitting and receiving a synchronization frame in accordance with an embodiment.

FIG. 11 shows a flowchart 1100 of a method of transmitting and receiving a synchronization frame in accordance with an embodiment. The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added. Moreover, although the method of flowchart 1100 is described herein with respect to synchronization frames, the method can be applied to master election and processing for any type of NAN frame including, for example, synchronization beacons and cluster discovery beacons.

In one aspect, at block 1101, the device 202 determines whether a sync frame is to be prepared for transmission for the discovery interval using a probability value P_sync. Stated another way, the device 202 may determine whether to prepare a sync frame for transmission based on a probability value. Alternatively, the device 202 can determine whether to cancel or transmit a prepared sync frame using the probability value P_sync. Accordingly, sync frames are only sent by a certain number of nodes within a NAN for any one discovery period.

For example, in some cases the probability value may be on the order of 1 such that the device 202 prepares the sync frame for transmission for every discovery period. Alternatively, according to another embodiment, the probability may be on the order of, for example, 0.3 such that the device 202 only prepares a sync frame for transmission during a discovery interval approximately every third discovery period. In an embodiment, each STA 106 can choose a pseudo-random number for comparison with P_sync, such that different STAs prepare sync frames for transmission during different discovery periods. In this way, sync frames are likely to be transmitted in all discovery periods but not by all STAs.

In an embodiment, the value of P_sync may be adapted during operation. For example, the value of P_sync may be adapted according to the number of STAs in the network, and/or the number of STAs detected by the device 202. For example, the value of P_sync can be reduced as the number of STAs in the neighborhood of the transmitting device 202 increases. In one embodiment, the device 202 can choose P_sync based on a number of devices N according to Equations 1-3, below.

$$\text{erfc}\left\{\frac{M1 - N \cdot p1}{\sqrt{2N(p1)(1-p1)}}\right\} > T1 \quad (1)$$

$$\text{erfc}\left\{\frac{M2 - N \cdot p2}{\sqrt{2N(p2)(1-p2)}}\right\} < T2 \quad (2)$$

$$P\_sync = \max(p1, p2) \quad (3)$$

As shown in Equations 1-3, above, the device 202 can choose P_sync such that the number of devices that contend is greater than a target minimum number of contending devices M1 with a threshold probability T1. In various embodiments, M1 can be between around 1 and around 10, such as, for example, 1. In some embodiments, M1 can be determined as a percentage of N such as, for example, 1%, 5%, or 10%. In various embodiments, T1 can be between around 0.9 and around 0.999, such as, for example, 0.9. Thus, the device 202 can determine the lowest p1 that satisfies Equation 1, where erfc is the complementary error function.

Similarly, the device 202 can choose P_sync such that the number of devices that contend is less than a target maximum number of contending devices M2 with a threshold probability T2. In various embodiments, M2 can be between around 50 and around 100, such as, for example, 75. In some embodiments, M2 can be determined as a percentage of N such as, for example, 10%, 15%, or 20%. In various embodiments, T1 can be between around 0.01 and around 0.2, such as, for example, 0.1. Thus, the device 202 can determine the highest p2 that satisfies Equation 2, where erfc is the complementary error function.

As shown in Equation 3, the device 202 can choose P_sync as the maximum of p1 and p2. In some embodiments, the device 202 can choose P_sync as the minimum of p1 and p2. In various other embodiments, the device 202 can choose P_sync as another value between p1 and p2 such as, for example, the average of p1 and p2, or more generally the sum of p1 and p2 times a fraction.

If the device 202 determines at block 1101 to prepare a sync frame based on the probability P_sync, then at block 1102, a sync frame is prepared for transmission. If the device 202 determines at block 1101 not to prepare the sync frame, then the device 202 can listen for time values from other STAs and update its own time value based on received time values as necessary to be synchronized (for example, at block 1112).

As discussed above, at block 1102, the device 202 prepares a sync frame for transmission. The sync frame can include a time stamp of the device 202 as described above, for example with respect to FIG. 10. In addition, the sync frame can include a network identifier that identifiers the NAN or "social Wi-Fi" network in which the device 202 is participating within. The identifier can be randomly generated when the network is first established between the STAs and can remain during the lifetime of the network. A device 202 receiving a sync frame with a network identifier may only perform an update of a time value based on a received time value if the network identifier received matches the network identifier of the network that the device 202 is currently participating within.

In some embodiments, the sync frame can include a device identifier such as, for example, a MAC address of the device 202. In some embodiments, the sync frame can include the MPV of the device 202. For example, the device 202 can generate the MPV as described above with respect to the MPV 550 and/or 560 of FIGS. 5B-C. Particularly, the device 202 can assert one or more most significant bit of the MPV when the device 202 is an anchor node. When the device 202 is not an anchor node, the device can unassert the most significant bit of the MPV. In anchored NANs, the device 202 can set one or more hop indication bits based on a hop distance to the nearest anchor node. In non-anchored NANs, the device 202 can unassert all hop indication bits. In both anchored and non-anchored NANs, the device 202 can set one or more preference indication bits based on one or more characteristics of the device 202.

In some embodiments, a plurality of nodes, or every node, in a NAN can each prepare a sync frame. In some embodiments, a subset of the devices in the NAN can prepare a sync frame. In some embodiments, the number of devices in the subset of devices can be based on the number of devices in the NAN. For example, the device 202 can prepare the sync frame using a probability value P_sync, as described above. In some embodiments, the device 202 can determine its contention parameters based on its MPV. For example, nodes having a higher MPV can attempt to transmit the sync frame during an earlier (or lower) contention slot (or window).

Next, at block 1106, the device 202 can begin a contention procedure for transmitting the sync frame during the discovery interval. In an embodiment, the device 202 can use contention parameters based on its MPV. For example, in some embodiments, the device 202 can determine whether it is an anchor node. If the device 202 is an anchor node, the device 202 can use a smaller contention window than a device that is not an anchor node. In some embodiments, the size of the contention window can be determined based on the MPV.

In some cases, before the contention procedures allows for the device 202 to transmit the sync frame, a sync frame can be received from another STA (e.g., STA 106b) during the discovery interval. The received sync frame can include the MPV 550 and/or 560 discussed above with respect to FIGS. 5B-C. For example, in an embodiment, the received sync frame can include the MPV 560, the SPV 561, and the DPV 562 of FIG. 5C.

At decision block 1108, the device 202 determines whether a sync frame is received from another STA 106b during the discovery interval. If by decision block 1108, a sync frame is not received from another STA 106b during the discovery interval, at block 1109, the prepared sync frame is transmitted by the device 202.

If a sync frame was received from another STA 106b, then at block 1110, the device 202 determines whether to transmit or suppress transmission of the prepared sync frame based on one or more of the received MPV 550 or 560, the received SPV 561, and the received DPV 562. For example, the device 202 can determine the MPV of the STA 106b from a capability field transmitted by the STA 106b. In some embodiments, the device 202 can determine whether to transmit or suppress transmission of the prepared sync frame in accordance with Table 1, below.

TABLE 1

|  | Received DPV Higher than Current DPV | Received DPV Equal to Current DPV | Received DPV Lower than Current DPV |
|---|---|---|---|
| Received MPV Higher than Current MPV | Suppress | Suppress | Transmit |

TABLE 1-continued

|  | Received DPV Higher than Current DPV | Received DPV Equal to Current DPV | Received DPV Lower than Current DPV |
|---|---|---|---|
| Received MPV Equal to Current MPV | Suppress | Suppress | Transmit |
| Received MPV Lower than Current MPV | Transmit | Transmit | Transmit |

Thus, if the received MPV is greater than or equal to the current MPV of the device 202, and the received DPV is greater than or equal to the current DPV of the device 202, then the device 202 cancels transmission of the sync frame at block 1111. If the received MPV is less than the current MPV of the device 202, or the received DPV is less than the current DPV of the device 202, then the device 202 proceeds to transmit the prepared sync frame at block 1109, at the next available time according to contention parameters.

A person having ordinary skill in the art will appreciate that alternative MPV schemes can be used. In an exemplary alternative scheme, the device 202 can determine whether the MPV of the device transmitting the sync frame is greater than or equal to the MPV of the device 202. If the received MPV is greater than or equal to the current MPV of the device 202, then the device 202 can cancel transmission of the sync frame at block 1111. If the received MPV is less than the current MPV of the device 202, then the device 202 can proceed to transmit the prepared sync frame at block 1109, at the next available time according to contention parameters. In one embodiment, lower MPVs can have greater preference for sync frame transmission.

At block 1111, if it is determined at block 1108 to cancel sync frame transmission, then the device 202 can listen for time values from other STAs and update its own time value based on received time values as necessary to be synchronized. For example, the received time stamp from STA 106b can then be used to potentially update the time of the device 202 according to one or more criteria as described in the embodiments below.

For example, at block 1112, the device 202 determines if the received time stamp is greater than a current time of the device 202. If, the received timestamp is greater than the current time stamp of the device 202, the device 202 adopts the received time stamp for use in determining when to transmit and receive as shown in block 1114. Otherwise, the current time stamp of the device 202 is not adopted at block 1116. In another embodiment, the device 202 can update its time value to the maximum of all received time stamps, all received time stamps sent by a STA having a higher MPV, or otherwise provided by any device or a combination of the embodiments described herein. The timestamp of the device 202 may not count in determining the maximum. This can ensure that a device 202 that has a faster drift and has not transmitted its sync frame keeps its clock in sync.

In a particular example, the device 202 can receive one or more beacons during the DW 402 (FIG. 4). Each beacon can include at least a time stamp, an MPV, and a device identifier such as a MAC address. The device 202 can store the received time stamp, MPV, and device identifier for each received beacon. At or around the end of the DW 402 (FIG. 4), the device 202 can update a timing synchronization function (TSF) timer to the received time stamp associated with the highest MPV. In cases where a plurality of time stamps have the same MPV, the device 202 can update the TSF timer further based on the device identifier. For example, the device 202 can use the time stamp associated with the highest MAC address, the highest hashed MAC address, etc. In some embodiments, cases where a plurality of time stamps have the same MPV, the device 202 can update the TSF timer further based on the time stamp. For example, the device 202 can use the time stamp having the greatest value.

In an embodiment, the device 202 can update the TSF timer based on the received time stamps in the beacons transmitted, including any beacons transmitted by the device 202. In this embodiment, the master rank or MPV of the device 202 and the MPV of the beacons received are disregarded for the update of the TSF. The device 202 can only update its TSF time using beacons with the same cluster identifier as its own. Upon receiving a beacon, the device 202 may filter such beacon based on timing criteria. In an embodiment, the criteria for discarding beacons will be based on whether a difference between a time stamp in the beacon and a time stamp of the device is greater than a threshold. In another embodiment, the criteria for discarding beacons will be based on whether a difference between a time stamp in the beacon and a mean of the time stamps of the other beacons is greater than a threshold. For all beacons that are not discarded, the device 202 will update the TSF based on the time stamps of the received beacons. In an embodiment, the device 202 can update the TSF to the mean of the time stamps from the received beacons. In another embodiment, the device 202 can update the TSF to the maximum of the time stamps from the received beacons. In another embodiment, the device 202 can update the TSF to the minimum of the time stamps from the received beacons. In another embodiment, the device 202 can update the TSF to the median of the time stamps from the received beacons.

In an embodiment, the device 202 can update the TSF timer when it receives a beacon, either directly from an anchor node or indirectly from other devices that are one or more hops away from the anchor node, that indicates the latest time value of the anchor node. Upon receiving a beacon, the device 202 may filter such beacon based on timing criteria. In one embodiment, the criteria for discarding beacons will be based on whether a difference between a time value when the beacon last received anchor timing information from an anchor (i.e. the value of the synchronization time age indicator 564) and the current time value for the device 202 is greater than a threshold. The anchor timing information may include a time value of when the device or beacon last updated its timing information with the anchor node. For all beacons that are not discarded, the device 202 will update the TSF based on the anchor time information of the received beacons. In some embodiments, when a device 202 receives anchor timing information from more than one device, the device 202 may update its TSF time from the device that has the most recent anchor timing information, provided that the anchor timing information is more recent than the device 202's anchor timing information.

In a non-anchored network, the TSF in different master nodes or devices can potentially drift. In an embodiment, the device 202 can update the TSF timer based on the received time stamps in the beacons transmitted, including any beacons transmitted by the device 202. For example, if the device 202 receives one or more beacons and none of the beacons are from an anchor node, the device 202 will update the TSF to the maximum of the time stamps from the received beacons.

In an embodiment, the criteria for updating a current time value of a device 202 based on received time value from another STA 106b can further depend on the received signal strength indication (RSSI) of the device 202. For example, based on the RSSI of the device 202, even where a device 202 receives a sync frame, it can nonetheless proceed with transmitting a sync frame it has prepared. In another embodiment, the criteria for updating the current time value of the device 202 can be based on whether the received time is a threshold amount greater than the current device time. In an embodiment, the threshold can be based on a maximum allowed clock drift network parameter.

Figure 12:
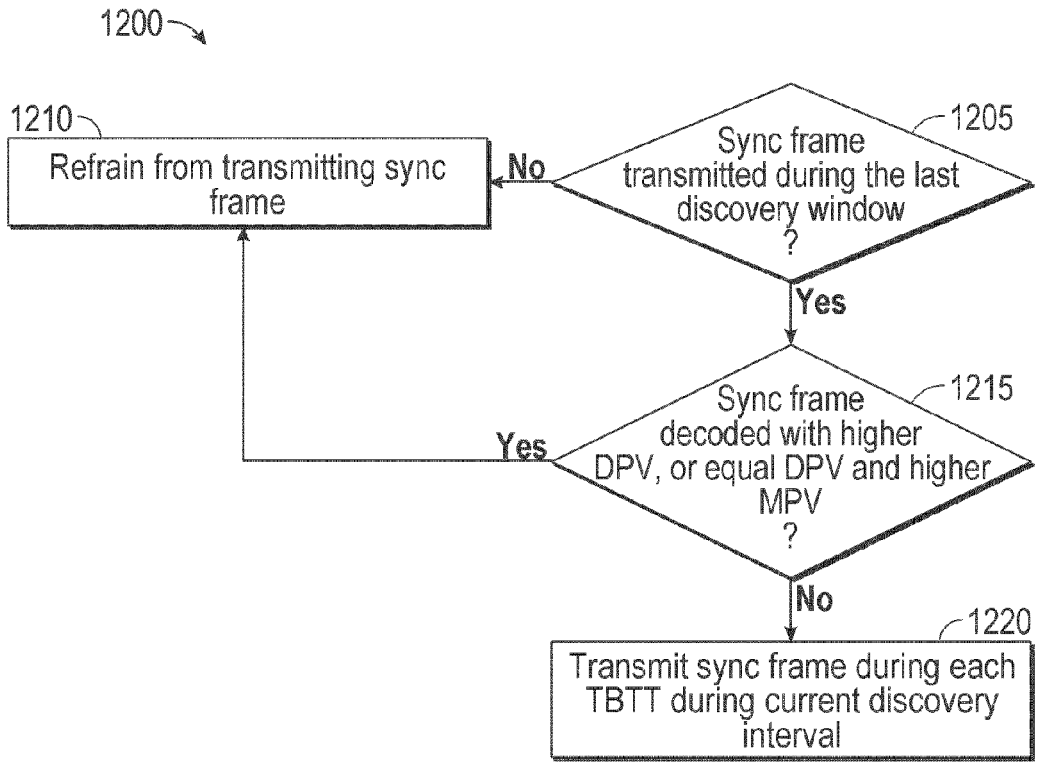
FIG. 12 shows a flowchart of a method of transmitting a synchronization frame in accordance with an embodiment.

FIG. 12 shows a flowchart 1200 of a method of transmitting a synchronization frame in accordance with an embodiment. In some embodiments, the method can coordinate transmission of sync frames during TBTTs and/or beacon windows between discovery windows. The method can be implemented in whole or in part by the devices described herein, such as the wireless device 202 shown in FIG. 2 of any of the STAs 106a-106i shown in FIGS. 1A-1B. Although the illustrated method is described herein with reference to the wireless communication systems 100 and 160 discussed above with respect to FIGS. 1A-1B, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1202, the device 202 determines whether it successfully transmitted a sync frame during the last discovery window. For example, the device 202 can determine whether it transmitted the prepared sync frame at block 1109 of FIG. 11. If the device 202 did not transmit a sync frame during the last discovery window, it can act as a non-master node. Accordingly, the device 202 can refrain from transmitting additional sync frames at block 1210.

In an embodiment, at block 1210, the device 202 can refrain from transmitting additional sync frames for the duration of the current discovery interval. In other words, the device 202 can refrain from transmitting additional sync frames until at least the next discovery window, during which the device 202 can re-initiate the contention process described in the flowchart 1100 of FIG. 11. In some embodiments, the device 202 can particularly refrain from transmitting additional sync frames during TBTTs and/or beacon windows between discovery windows.

Next, at block 1215, when the device 202 has transmitted a sync frame during the last discovery window, the device 202 determines whether it should transmit or suppress additional sync frames based on one or more of an MPV, an SPV, and a DPV of one or more received sync frames. For example, the device 202 can receive and/or decode one or more sync frames from other devices. Received sync frames can include the MPV 550 and/or 560 discussed above with respect to FIGS. 5B-C. For example, in an embodiment, received sync frames can include the MPV 560, the SPV 561, and the DPV 562 of FIG. 5C. In some embodiments, the device 202 can determine whether to transmit or suppress transmission of additional sync frames in accordance with Table 2, below.

TABLE 2

|  | Received DPV Higher than Current DPV | Received DPV Equal to Current DPV | Received DPV Lower than Current DPV |
| --- | --- | --- | --- |
| Received MPV Higher than Current MPV | Suppress | Suppress | Transmit |
| Received MPV Equal to Current MPV | Suppress | Transmit | Transmit |
| Received MPV Lower than Current MPV | Suppress | Transmit | Transmit |

Thus, if the device 202 has received a sync frame having a higher DPV during the current discovery interval, the device can act as a non-master node. Accordingly, the device 202 can refrain from transmitting additional sync frames at block 1210. The device 202 can refrain from transmitting additional sync frames until at least the next discovery interval.

Moreover, if the device 202 has received a sync frame having an equal DPV during the current discovery interval, the device 202 can determine whether the sync frame also includes a higher MPV than the MPV of the device 202. If the received sync frame has an equal DPV, and a higher MPV, the device 202 can refrain from transmitting additional sync frames at block 1210. The device 202 can refrain from transmitting additional sync frames until at least the next discovery interval.

A person having ordinary skill in the art will appreciate that alternative MPV schemes can be used. In an exemplary alternative scheme, when the received DPV is equal to the current DPV, and the received MPV is equal to the current DPV, the device 202 can refrain from transmitting additional sync frames at block 1210. The device 202 can refrain from transmitting additional sync frames until at least the next discovery interval. In some embodiments, the device 202 can determine that a transmitting node cannot hear transmissions from the device 202 based on having received a sync frame from the transmitting node with an equal MPV.

In another alternative MPV scheme, the device 202 can determine whether it has received a sync frame with an MPV greater than the MPV of the device 202. If a received MPV is greater than the MPV of the device 202, the device 202 can refrain from transmitting additional sync frames at block 1210. The device 202 can refrain from transmitting additional sync frames until at least the next discovery interval.

Then, at block 1220, when the device 202 has not received a sync frame from a device with a higher DPV, or an equal DPV and a higher MPV, the device 202 can act as a master node at block 1220. Accordingly, the device 202 can transmit a sync frame during one or more TBTTs and/or beacon windows in the current discovery interval. In some embodiments, the device 202 can transmit a sync frame during every TBTT and/or beacon window until at least the next discovery window. During the next discovery window, the device 202 can re-initiate the contention process described in the flowchart 1100 of FIG. 11. Accordingly, master nodes can be determined more fairly because they can have an opportunity to change at each discovery window.

In some embodiments, the device 202 can continue to monitor transmission of sync frames, for example at each subsequent TBTT and/or beacon window. If the device 202 sees another sync frame associated with a higher DPV, or an equal DPV and a higher MPV, the device 202 can recharacterize as a non-master node. Accordingly, the device 202 can refrain from transmitting additional sync frames at block 1210.

Figure 13:
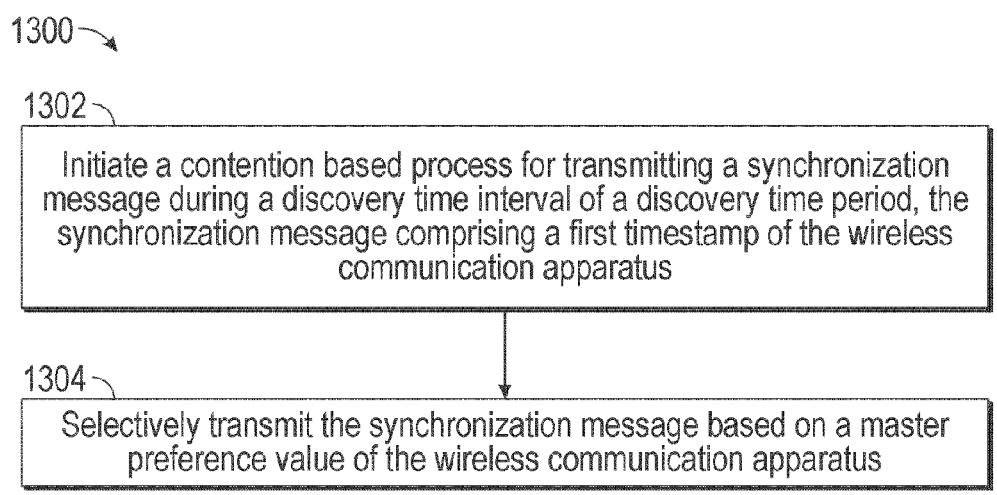
FIG. 13 shows a flowchart for an exemplary method of wireless communication that can be employed within the wireless communication system of FIG. 1.

FIG. 13 shows a flowchart 1300 for an exemplary method of wireless communication that can be employed within the wireless communication system 100 of FIG. 1. The method can be implemented in whole or in part by the devices described herein, such as the wireless device 202 shown in FIG. 2. Although the illustrated method is described herein with reference to the wireless communication system 100 discussed above with respect to FIG. 1, and the wireless device 202 discussed above with respect to FIG. 2, a person having ordinary skill in the art will appreciate that the illustrated method can be implemented by another device described herein, or any other suitable device. Although the illustrated method is described herein with reference to a particular order, in various embodiments, blocks herein can be performed in a different order, or omitted, and additional blocks can be added.

First, at block 1302, the device 202 initiates a contention based process for transmitting a synchronization message during a discovery time interval of a discovery time period. The synchronization message includes a first timestamp of the wireless communication apparatus. For example, the device 202 can contend for a transmission slot during the TBTT of the discovery window DW (FIG. 7).

In an embodiment, the device 202 can selectively prepare a synchronization message for transmission during the discovery time interval based on a probability value corresponding to a frequency for preparing the synchronization message over a plurality of discovery time periods. For example, the device 202 can selectively prepare (or selectively transmit, selectively refrain from transmitting, or selectively refrain from preparing) a synchronization message as discussed above with respect to block 1101 of FIG. 11 and Equations 1-3.

Next, at block 1304, the device 202 selectively transmits the synchronization message based on a master preference value of the wireless communication apparatus. For example, the device 202 can transmit the message 1000 (FIG. 10) during the TBTT of the discovery window DW (FIG. 7) based on the MPV of the device 202. As discussed above, with respect to FIG. 10, the device 202 can compare its MPV to the MPV associated with sync frames received from other devices. The device 202 can transmit its sync frame if it does not see a sync frame associated with a higher DPV, or an equal DPV and a higher MPV, and can refrain from transmitting its sync frame if it does see a sync frame associated with a higher DPV, or an equal DPV and a higher MPV. In an embodiment, the MPV can be associated with sync frames through inclusion in a capability field of each sync frame.

In an embodiment, the MPV can include an anchor flag, a sync time age indicator, a hop indicator, and a preference indicator. In an embodiment, the anchor flag can include one bit, the sync time age indicator can include three bits, the hop indicator can include three bits, and the preference indicator can include four bits. For example, the MPV can include the MPV 550 and/or 560 described above with respect to FIGS. 5B-C.

In an embodiment, the device 202 can assert the anchor flag when the wireless communication apparatus is an anchor node. For example, the device 202 can determine whether it is an anchor node. The device 202 can assert the anchor flag when the device 202 is an anchor node. The device 202 can unassert the anchor flag when the device 202 is not an anchor node (including, for example, when the device 202 is in a non-anchored network).

In an embodiment, the device 202 can set the sync time age indicator to all ones when the wireless communication apparatus is an anchor node. The device 202 can set the sync time age indicator to all zeroes when the wireless communication apparatus is in a non-anchored network. The device 202 can otherwise set the sync time age indicator to the greater of zero and a sync time age indicator of a synchronization node minus a number of discover windows that have elapsed since a synchronization with the synchronization node.

In an embodiment, the device 202 can set the hop indicator to all ones when the wireless communication apparatus is an anchor node or has received a message from an anchor node. The device 202 can set the hop indicator to all zeroes when the wireless communication apparatus is in a non-anchored network. The device 202 can otherwise set the hop indicator to the greater of zero and a highest observed hop indicator minus one.

In an embodiment, the device 202 can set the preference indicator based on one or more characteristics of the wireless communication apparatus. For example, the device 202 can determine one or more characteristics such as, for example, an RF characteristic (e.g., link speed, signal strength, etc.), a power source, a power consumption rate, a remaining battery power, a clock type, a clock accuracy, a processor load, a user interaction, a preset value, etc.

In an embodiment, the device 202 can receive one or more received synchronization messages associated with one or more master preference values. The device 202 can refrain from transmitting the synchronization message when at least one received synchronization message is associated with a master preference value greater than or equal to the master preference value of the wireless communication apparatus and a discovery preference value greater than or equal to a discovery preference value of the wireless communication apparatus. In an embodiment, the device 202 can update a time value of a clock signal of the device 202 to a value derived from the received synchronization messages.

In an embodiment, the device 202 can selectively transmit, during at least one subsequent transmission time, one or more additional synchronization messages when the apparatus has transmitted a synchronization message during the discovery time interval and not received a synchronization message associated with a discovery preference value higher than a discovery preference value of the wireless communication apparatus, or a discovery preference value equal to the discovery preference value of the wireless communication apparatus and a master preference value higher than the master preference value of the wireless communication apparatus. For example, the device 202 can selectively transmit the message 1000 (FIG. 10) during one or more TBTTs or beacon windows the discovery period DP (FIG. 7).

In an embodiment, the device 202 can selectively prepare the synchronization message for transmission based on a probability value corresponding to a frequency for preparing the synchronization message over a plurality of discovery time periods. The device 202 can cancel transmission of the synchronization message in response to receiving a synchronization messages associated with a master preference value equal or greater to a master preference value of the wireless communication apparatus. In an embodiment, the received synchronization messages can include received timestamps. The device 202 can update the time value to the single received timestamp in response to determining the single received timestamp is greater than a first timestamp.

In an embodiment, the device 202 can update the time value of the wireless communication apparatus by updating the time value to a maximum of the received timestamps. In an embodiment, the device 202 can determine the probability value based on one or more of: a number of devices in a neighborhood aware network and a number of devices seen by the wireless communication apparatus.

In an embodiment, the device 202 can set a master preference value of the wireless communication apparatus to a minimum value when the wireless communication apparatus does not support a master election process. In an embodiment, the device 202 can determine one or more contention parameters based on the master preference value. In an embodiment, the wireless device 202 can selectively transmit additional synchronization messages until the next discovery interval. In an embodiment, one or more synchronization messages can include the master preference value.

In an embodiment, the method shown in FIG. 13 can be implemented in a wireless device that can include an initiating circuit and a transmitting circuit. Those skilled in the art will appreciate that a wireless device can have more components than the simplified wireless device described herein. The wireless device described herein includes only those components useful for describing some prominent features of implementations within the scope of the claims.

The initiating circuit can be configured to initiate the contention based process. The initiating circuit can be configured to perform at least block 1302 of FIG. 13. The determining circuit can include one or more of the processor 204 (FIG. 2), the memory 206 (FIG. 2), transmitter 210 (FIG. 2), the receiver 212 (FIG. 2), the antenna 216 (FIG. 2), and the transceiver 214 (FIG. 2). In some implementations, means for determining can include the determining circuit.

The transmitting circuit can be configured to selectively transmit the synchronization message. The transmitting circuit can be configured to perform at least block 1304 of FIG. 13. The transmitting circuit can include one or more of the transmitter 210 (FIG. 2), the antenna 216 (FIG. 2), and the transceiver 214 (FIG. 2). In some implementations, means for transmitting can include the transmitting circuit.

In NAN systems such as described above, it can also be advantageous to reduce the amount of time that the networked devices are in an awake active mode for the communications that occur during the discovery windows 402. As the devices are often battery powered, this can help lower power consumption and extend battery life.

The clock oscillators in these devices generally have a nominal clock rate along with a tolerance range within which the clock rate is essentially guaranteed to remain over temperature variations, aging, and the like, such as 1 MHz nominal rate±20 ppm. Because each clock rate of each device may vary within its tolerance range, time synchronization between the devices will be lost between the successive synchronization operations performed during successive discovery windows 402. This is illustrated in FIG. 14.

Figure 14:
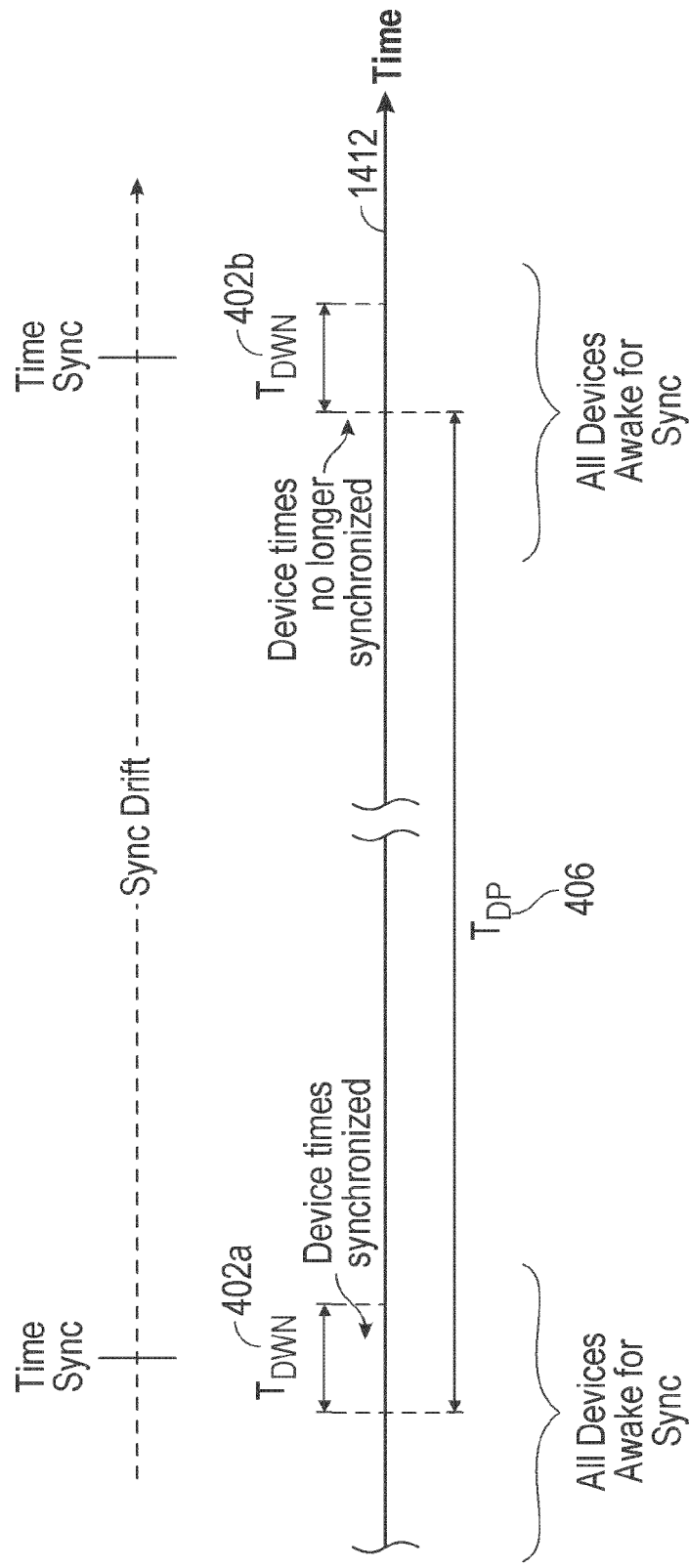
FIG. 14 is a timeline showing two discovery windows separated by a discovery period.

FIG. 14 shows a timeline 1412 with two successive discovery windows 402a and 402b. Each discovery window has a nominal duration of $T_{DWN}$, and the successive discovery windows 402a, 402b are separated by a discovery period 406 having a nominal duration of $T_{DPN}$. The nominal durations $T_{DWN}$ and $T_{DPN}$ are established as essentially fixed parameters of the NAN. During the first discovery window 402a, all devices of the NAN are active, and a master device establishes an absolute time reference point for all devices in the NAN. Once this occurs and the discovery window 402a ends, some or all of the devices of the NAN may transition to a low power sleep mode. As time passes, one second or more for example, to the next discovery window 402b, the different clock rates in the different devices of the NAN cause the absolute time in the devices (measured as clock transitions of the clock in each different device of the NAN) to drift apart from one another. However, all of the devices must again become active for the next discovery window 402b. It is beneficial if the waking up time period for the discovery period 402b is as short as possible.

Figure 15:
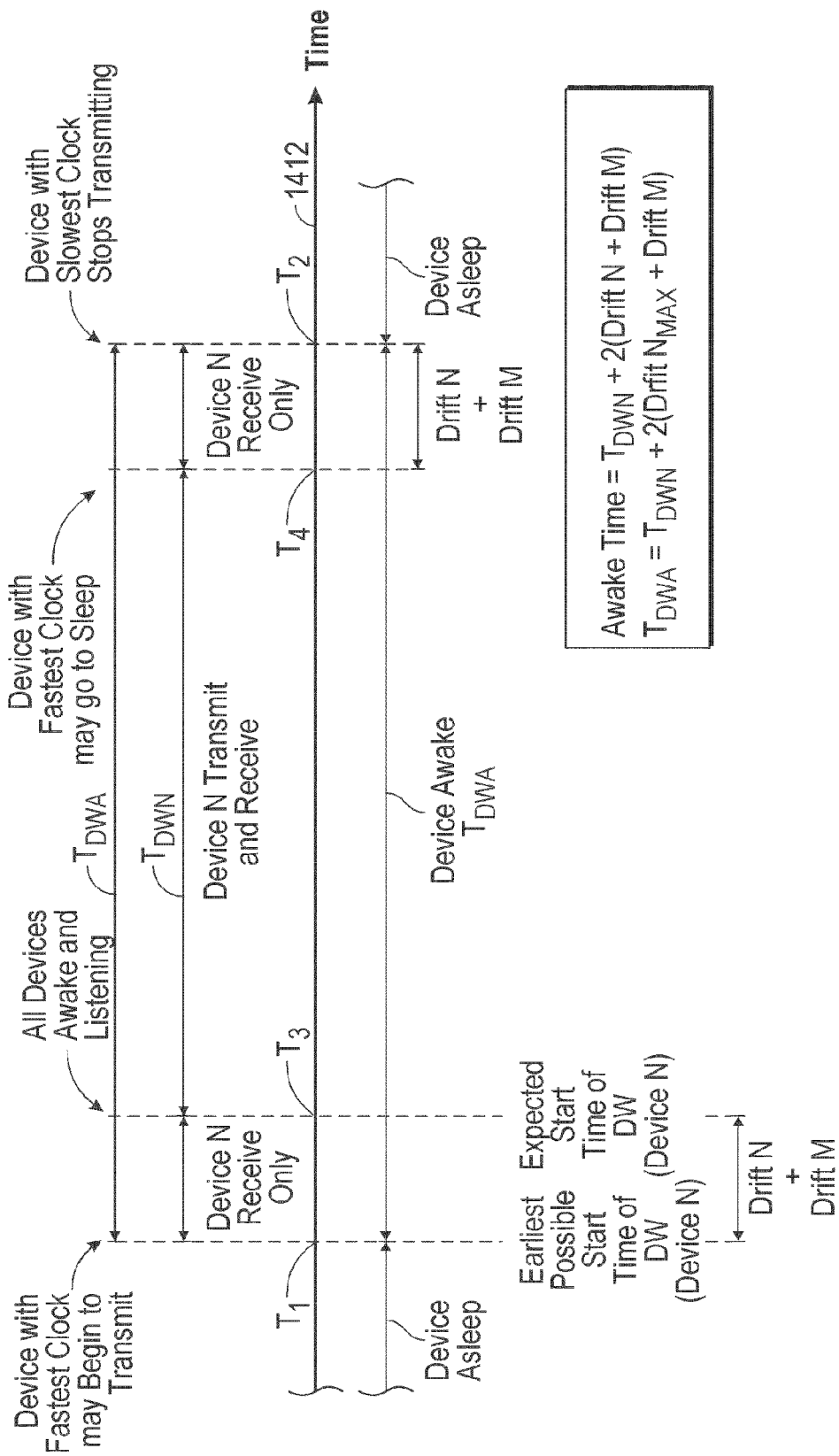
FIG. 15 is a timeline showing the portion of the timeline of FIG. 14 associated with the second discovery window with a first implementation of transition timing from a low power sleep mode to a higher power active mode for a networked wireless communication device.

FIG. 15 illustrates the timeline of FIG. 14 in the region of the second discovery period 402b. In this Figure, the time drift of device N of the NAN is referred to as DriftN, and is the maximum amount of absolute time deviation device N can experience over the time period $T_{DPN}$. For example, if $T_{DPN}$ is one second, and the clock is a 1 MHz clock with tolerance±20 ppm, then DriftN is 20 microseconds. In the implementation of FIG. 15, each device of the NAN (referred to generically herein as "device N") that is in a sleep mode prior to the discovery window 402b may calculate an expected time for the start of discovery window 402b, which is designates $T_3$ in FIG. 15. For example, if $T_{DPN}$ is one second, and device N has a 1 MHz nominal clock rate, time $T_3$ will be one million internal clock transitions from the start of discovery window 402a. However, because other devices on the NAN may have faster clocks, each device N may be configured transition to an active state prior to this point so that it is active to receive any discovery window transmissions produced by other devices of the NAN.

To guarantee it is in an awake state for any such transitions, but to minimize the total amount of awake time, device N may transition to an active state at time $T_1$ of FIG. 15. This is a point that is equal to time $T_3$ minus the sum (DriftN+DriftM), where DriftM is the drift of the device of the NAN with the largest drift, which may correspond to the device of the NAN having the largest clock rate tolerance. In many cases, a networking standard such as one or more of the IEEE 802.11 family will specify clock tolerances for members of a network, and DriftN will be equal to DriftM, but this need not be the case. In some cases, the clock rate tolerance and thus the drift of different devices of the NAN may be different. The devices of the NAN may communicate their clock parameters to each other, such that each device will know both its own drift, and the drift of other devices in the NAN. In one possible implementation, a synchronization message such as shown in FIG. 10 can include clock parameters for the sending device. As the identity of the master device is negotiated during discovery windows 402, the members of the NAN can collect information about the drift of the various NAN members through these messages. If this information is not available for some NAN members, a clock tolerance standard may specify a largest compliant tolerance, and the members of the NAN may assume that a given other device is operating at this highest tolerance when it has no information about the clock parameters of that device.

The above example assumes that clock tolerances are set forth in a networking standard, but it would also be possible to specify drift parameters directly in a networking standard. For example, if $T_{DPN}$ is specified in the networking standard, a drift parameter in units of time may be part of the standard as well, defining a DriftN value directly for all compliant members of a NAN. Manufacturers of standard compliant devices may satisfy the standard in a variety of ways, but would ensure that the timing of their devices would not drift larger than the DriftN of the standard over the $T_{DPN}$ of the standard. As with the clock parameters, each device could have an internal DriftN value for itself, which may be different for different devices, but always less than any maximum specified in the networking standard. These individual DriftN values could be communicated between members of the NAN as described above.

Although device N may be prepared to receive discovery window transmissions starting at time $T_1$, it may be configured to refrain from making any discovery window transmissions itself until time $T_3$. This is because during the period between time $T_1$ and $T_3$, some devices of the NAN with slower clocks than device N may not be in an awake mode yet. Thus, device N will only transmit after time $T_3$.

Device N may then continue to transmit and/or receive discovery window messages until time $T_4$, which is $T_{DWN}$ after time $T_3$. At this point, device N will cease transmissions, because devices with faster clocks may begin to go to sleep at time $T_4$. However, device N will continue in an active state until time $T_2$ to listen for further discovery window transmissions from devices with slower clocks. Similar to the time period between times $T_1$ and $T_3$, the time period between times $T_4$ and $T_2$ is the sum of DriftN plus DriftM. At time $T_2$, device N may transition back to a low power sleep mode. If each of the devices of the NAN follows this procedure, every device will be active to receive transmissions from every other device, and each device of the NAN will only transmit when all of the other devices are in an active state and listening for discovery window transmissions. The total time that each device N is awake for this process is $T_{DW}$ plus twice the sum of Drift1 plus Drift2. The duration of the actual discovery window, designated $T_{DWA}$ in FIG. 15, which may be defined as the time period between the earliest possible discovery window transmission from a NAN member at time $T_1$ to the last possible discovery window transmission from a NAN member at time $T_2$ is equal to $T_{DWN}$ plus twice the sum of DriftN$_{max}$ plus DriftM, where DriftN$_{max}$ is the drift of the NAN device, other than device M, with the largest clock tolerance. For the simple and most easily implemented design, the clock tolerances or other drift parameter(s), and therefore drifts, of all the devices are the same, and $T_{DWA}$ will be equal to $T_{DWN}$ plus four times DriftN.

Figure 16:
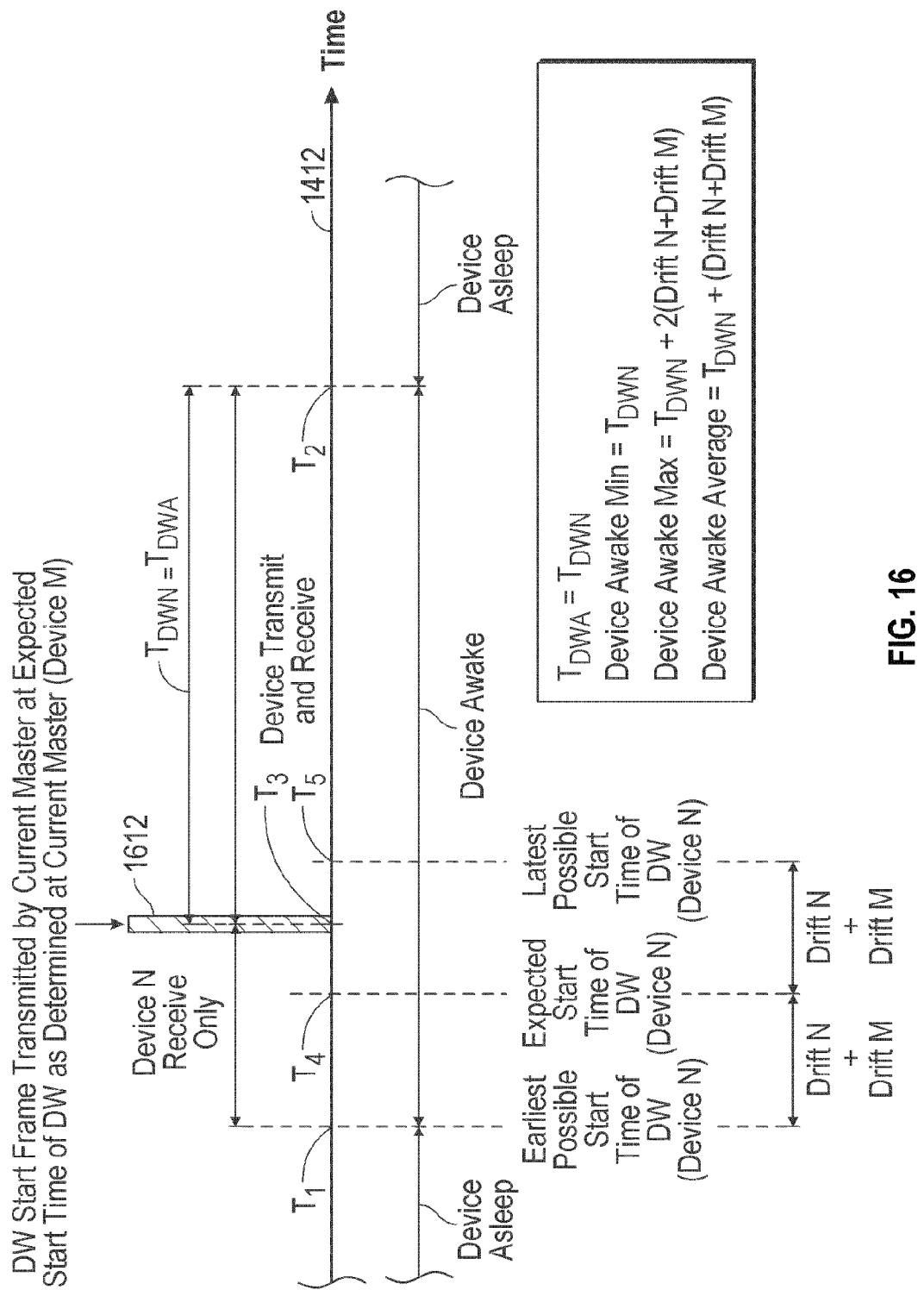
FIG. 16 is a timeline showing the portion of the timeline of FIG. 14 associated with the second discovery window with a second implementation of transition timing from a low power sleep mode to a higher power active mode for a networked wireless communication device.

FIG. 16 also illustrates the timeline of FIG. 14 in the region of the second discovery period 402b, and illustrates a second implementation of a sleep to awake mode transition timing protocol for members of a NAN. As described above, a NAN system may operate where during each discovery window, one member of the NAN is selected as a master device responsible for sending beacons during the discovery period between discovery windows. During the discovery window in which this master device is selected, the other devices of the NAN synchronize their internal times using information provided by this selected master unit.

In the implementation of FIG. 16, this master unit may determine its own estimated time for the start of the next discovery window. When this time is reached, according to the internal clocking of the master device, the master device may send an additional discovery window start frame 1612 to the other devices of the NAN. The other devices of the NAN use this received start frame to initiate their own discovery window operations of receiving and transmitting discovery window messages as described above. The format of the discovery window start frame 1612 may vary. For example, it may be a beacon frame with a flag bit or field indicating it is a start frame, or a clear to send (CTS) frame with a NAN identification field.

As illustrated in FIG. 16, the discovery window start frame 1612 is sent at time $T_3$, which is the master unit's estimated time for the start of the discovery frame 402b. This time may be determined by the master unit by using its own internal clock to measure the time $T_{DP}$ as established in the NAN from the beginning of the last discovery window 402a.

At time $T_3$, upon receipt of the discovery window start frame 1612, the members of the NAN initiate discovery window communications, and continue this process until time $T_2$, which is calculated by each member of the NAN as a duration of $T_{DWN}$ (as also established by the NAN) following time $T_3$.

Each member of the NAN should be awake at time $T_3$ when the current master sends the discovery window start frame 1612. Due to the clock drift described above, each device (again generically referred to as "device N") may generate its own internal estimate of the expected start time of the discovery window 402b, corresponding in FIG. 16 with time $T_4$. If the current master has a faster clock than the device N, the start frame 1612 may be sent earlier than this however. To ensure that it is awake when the current master sends the start frame 1612, device N may transition from a sleep mode to an awake active mode at time $T_1$, where $T_1$ is calculated as estimated time $T_4$ minus the sum (DriftN+DriftM), where in FIG. 16 DriftM is the drift of the current master device.

Because the current master may have either a slower clock or a faster clock than device N, the start frame 1612 will be received in a time window between times $T_1$ and $T_5$, which has a width of 2DriftN plus 2DriftM. If device N has the slowest clock, and device M has the fastest clock, the discovery window start frame 1612 will be received immediately after device N transitions to an awake state at or near time $T_1$, and the total awake time for device N will be essentially equal to $T_{DWN}$. If device N has the fastest clock, and device M has the slowest clock, the discovery window start frame 1612 will be received at time $T_5$, and the total awake time for device N will be $T_{DWN}$ plus two times the sum (DriftN+DriftM). The average awake time for device N over a large number of successive discovery windows will be $T_{DWN}$ plus DriftN plus DriftM. This can be an advantage provided by use of the discovery window start frame 1612 over the protocol of FIG. 15, since in FIG. 15, the awake time is always $T_{DWN}$ plus two times the sum (DriftN+DriftM), whereas in FIG. 16, this is the maximum necessary awake time, with the average time being less than this. This can conserve power for battery operated portable devices that are members of the NAN. Another advantage of the discovery window start frame 1612 is that the actual discovery window duration $T_{DWA}$, defined as the time between the earliest possible discovery window message transmission time and the latest possible discovery window message transmission time, is equal to the nominal network established value of $T_{DWN}$. Thus, the discovery window width is always the same, and only its absolute time position is affected by drift, specifically by the drift of the current master that sends the discovery window start frame 1612. This can be useful in reserving time for the discovery window using the NAV, and can be useful for coexistence.

In some cases, a given member of the NAN may miss one or more successive discovery windows, and fail to synchronize its local time value for two or more periods of $T_{DPN}$. If this occurs, the device may widen its listening window as it searches for discovery window transmissions to account for the additional drift produced by the longer time period between synchronization.

In the implementation of FIG. 15, for example, a device may be configured to calculate a wake up time $T_1$ as $T_3$ minus (n+1)(DriftN+DriftM), where n is the number of missed discovery windows since the last discovery window where the deviceceived time synchronization information, and $T_3$ is the locally measured time lapse (n+1)$T_{DPN}$. Similarly, the time $T_2$ can be extended to be $T_4$ plus (n+1)(DriftN+DriftM), where $T_4$ is $T_3$ plus $T_{DWN}$ as usual. If the device wakes up for a discovery window and fails to receive synchronization information, the value of n is incremented by one for the computation of the next discovery window wake up and sleep transition times. The value n is reset to zero when a device is successfully synchronized during a discovery window.

In the protocol of FIG. 16, the listening window between times $T_1$ and $T_5$ within which the device expects to receive a discovery window start frame 1612 can be similarly extended to time $T_4 \pm (n+1)$(DriftN+Drift M), where time $T_4$ is (n+1)$T_{DPN}$. In this case, the device may transition back to a sleep mode at time $T_5$, which will be $T_4$ plus (n+1)(DriftN+DriftM) if no discovery window start frame is received when this time $T_5$ is reached. If this occurs, n is incremented by one for the computation of the awake and sleep times for the next discovery window.

In the above discussion of FIGS. 14, 15, and 16, certain events such as transitioning to an active mode or to a sleep mode, or sending frames of data are described as occurring at certain specifically defined times. Of course, exact timing is a practical impossibility, the events themselves may have their own durations from start to completion, and it may also be useful to further include buffer periods around the described times, such as awakening slightly before time $T_1$ and entering a sleep mode slightly after $T_2$ instead of exactly at these times. Thus, the event times described here are intended to be approximate in nature, in accordance with the desired goals of maintaining time synchronization, successfully exchanging messages during discovery windows, and reducing the amount of awake time for the members of the NAN to perform these processes.

It should be understood that any reference to an element herein using a designation such as "first," "second," and so forth does not generally limit the quantity or order of those elements. Rather, these designations can be used herein as a convenient wireless device of distinguishing between two or more elements or instances of an element. Thus, a reference to first and second elements does not mean that only two elements can be employed there or that the first element can precede the second element in some manner. Also, unless stated otherwise a set of elements can include one or more elements.

A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof.

A person/one having ordinary skill in the art would further appreciate that any of the various illustrative logical blocks, modules, processors, means, circuits, and algorithm steps described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with FIGS. 1-9 can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps in any disclosed process is an example of a sample approach. Based upon design preferences, it is understood that the specific order or hierarchy of steps in the processes can be rearranged while remaining within the scope of the present disclosure. The accompanying method claims present elements of the various steps in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. In a first device of a neighborhood aware network (NAN), a method of determining at least one of a time for exiting and a time for entering a low power sleep mode to utilize a discovery window comprising:
    determining an earliest possible start time of the discovery window according to a clock at the first device;
    transitioning from the low power sleep mode to a higher power active mode at the determined earliest possible start time, the determined earliest possible start time based at least in part on a clock drift value associated with the first device and a clock drift value associated with a second device of the network;
    receiving, from the second device, a signal defining a start time of the discovery window; and
    transitioning to the low power sleep mode at the end of a pre-determined time duration after receiving the signal defining the start time of the discovery window, the pre-determined time duration being independent of a time duration for the first device to transmit, wherein the pre-determined time duration is equal to a pre-determined discovery window duration plus two times the sum of the clock drift value associated with the first device and the clock drift value associated with the second device.

2. The method of claim 1, wherein the pre-determined time duration is approximately equal to the pre-determined discovery window duration.

3. The method of claim 1, comprising transitioning to the low power sleep mode at the end of the pre-determined time duration after transitioning from the low power sleep mode.

4. The method of claim 1, wherein the clock drift value associated with the first device is approximately the same as the clock drift value associated with the second device.

5. The method of claim 1, wherein the clock drift value associated with the first device is different than the clock drift value associated with the second device.

6. The method of claim 1, wherein the determined earliest possible start time of the discovery window is equal to an expected start time of the discovery window minus the sum of the clock drift value associated with the first device and the clock drift value associated with the second device.

7. The method of claim 1, wherein the clock drift values are based at least in part on a time duration between adjacent discovery windows.

8. A wireless communication device in a neighborhood aware network (NAN) comprising:
    transceiver circuitry configured to receive, from a second device, a signal defining a start time of a discovery window;
    a processor configured to:
        communicate with other wireless communication devices in a wireless network during the discovery window used for timing synchronization between networked devices;
        determine an earliest possible start time of a discovery window according to a clock source at the wireless communication device;
        transition the wireless communication device from a low power sleep mode to a higher power active mode at the determined earliest possible start time, the determined earliest possible start time based at least in part on a maximum clock drift value associated with the wireless communication device and a maximum clock drift value associated with the second device; and
        transition the wireless communication device to the low power sleep mode at the end of a pre-determined time duration after receiving the signal defining the start time of the discovery window, the pre-determined time duration being independent of a time duration for the wireless communication device to transmit, wherein the pre-determined time duration is equal to a pre-determined discovery window duration plus two times the sum of the clock drift value associated with the wireless communication device and the clock drift value associated with the second device.

9. The wireless communication device of claim 8, wherein the pre-determined time duration is approximately equal to the pre-determined discovery window duration.

10. The wireless communication device of claim 8, wherein the processor is configured to enter the low power sleep mode at the end of the pre-determined time duration after transitioning from the low power sleep mode.

11. The wireless communication device of claim 8, wherein the clock drift value associated with the wireless communication device is approximately the same as the clock drift value associated with the second device.

12. The wireless communication device of claim 8, wherein the clock drift value associated with the wireless communication device is different than the clock drift value associated with the second device.

13. The wireless communication device of claim 8, wherein the determined earliest possible start time of the discovery window is equal to an expected start time of the discovery window minus the sum of the clock drift value associated with the wireless communication device and the clock drift value associated with the second device.

14. The wireless communication device of claim 8, wherein the clock drift values are based at least in part on a time duration between adjacent discovery windows.

15. A non-transitory computer readable media having instructions stored thereon that cause a wireless communication device to:
    communicate with other wireless communication devices in a wireless network during a discovery window used for timing synchronization between networked devices;
    determine an earliest possible start time of a discovery window according to a clock source at the wireless communication device;
    transition from a low power sleep mode to a higher power active mode at the determined earliest possible start time, the determined earliest possible start time based at least in part on a maximum clock drift value associated with the wireless communication device and a maximum clock drift value associated with a second wireless communication device;
    receive, from the second device, a signal defining a start time of the discovery window; and
    transition to the low power sleep mode at the end of a pre-determined time duration after receiving the signal defining the start time of the discovery window, the pre-determined time duration being independent of a time duration for the wireless communication device to transmit, wherein the pre-determined time duration is equal to a pre-determined discovery window duration plus two times the sum of the clock drift value associated with the wireless communication device and the clock drift value associated with the second device.

16. The media of claim 15, wherein the pre-determined time duration is approximately equal to the pre-determined discovery window duration.

17. The media of claim 15, wherein the instructions cause the wireless communication device to transition to the low power sleep mode at the end of the pre-determined time duration after transitioning from the low power sleep mode.

18. The media of claim 15, wherein the determined earliest possible start time of the discovery window is equal to an expected start time of the discovery window minus the sum of the clock drift value associated with the wireless communication device and the clock drift value associated with the second device.

19. The media of claim 15, wherein the clock drift value associated with the wireless communication device is approximately the same as the clock drift value associated with the second device.

20. The media of claim 15, wherein the clock drift value associated with the wireless communication device is different than the clock drift value associated with the second device.

21. The media of claim 15, wherein the clock drift values are based at least in part on a time duration between adjacent discovery windows.

22. A wireless communication device of a wireless network comprising:
    means for communicating with other wireless communication devices in the wireless network during a discovery window used for timing synchronization between network devices;
    means for determining an earliest possible start time of the discovery window according to a clock source at the wireless communication device;
    means for transitioning from a low power sleep mode to a higher power active mode at the determined earliest possible start time, the determined earliest possible start time based at least in part on a clock drift value associated with the wireless communication device and a clock drift value associated with a second device;
    means for receiving, from the second device, a signal defining a start time of the discovery window; and
    means for transitioning to the low power sleep mode at the end of a predetermined time duration after receiving the signal defining the start time of the discovery window, the pre-determined time duration being independent of a time duration for the wireless communication device to transmit, wherein the pre-determined time duration is equal to a pre-determined discovery window duration plus two times the sum of the clock drift value associated with the wireless communication device and the clock drift value associated with the second device.

23. The wireless communication device of claim 22, wherein the pre-determined time duration is approximately equal to the pre-determined discovery window duration.

24. The wireless communication device of claim 22, wherein the means for transitioning is configured to enter the low power sleep mode at the end of the pre-determined time duration after transitioning from the low power sleep mode.

25. The wireless communication device of claim 22, wherein the clock drift value associated with the wireless communication device is approximately the same as the clock drift value associated with the second device.

26. The wireless communication device of claim 22, wherein the clock drift value associated with the wireless communication device is different than the clock drift value associated with the second device.

27. The wireless communication device of claim 22, wherein the determined earliest possible start time of the discovery window is equal to an expected start time of the discovery window minus the sum of the clock drift value associated with the wireless communication device and the clock drift value associated with the second device.

28. The wireless communication device of claim 22, wherein the clock drift values are based at least in part on a time duration between adjacent discovery windows.

* * * * *